(12) United States Patent
Maruhashi

(10) Patent No.: US 10,769,100 B2
(45) Date of Patent: Sep. 8, 2020

(54) METHOD AND APPARATUS FOR TRANSFORMING DATA

(71) Applicant: FUJITSU LIMITED, Kawasaki-shi, Kanagawa (JP)

(72) Inventor: Koji Maruhashi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/720,998

(22) Filed: Sep. 29, 2017

(65) Prior Publication Data

US 2018/0095933 A1 Apr. 5, 2018

(30) Foreign Application Priority Data

Sep. 30, 2016 (JP) .................................. 2016-193267

(51) Int. Cl.
| | | |
|---|---|---|
| *G06F 16/00* | (2019.01) | |
| *G06F 15/82* | (2006.01) | |
| *G06F 17/10* | (2006.01) | |
| *G06F 15/80* | (2006.01) | |
| *G06F 17/15* | (2006.01) | |
| *G06F 17/18* | (2006.01) | |
| *G06F 15/76* | (2006.01) | |

(52) U.S. Cl.
CPC .......... *G06F 15/82* (2013.01); *G06F 15/8053* (2013.01); *G06F 17/10* (2013.01); *G06F 17/153* (2013.01); *G06F 17/18* (2013.01); *G06F 2015/763* (2013.01)

(58) Field of Classification Search
CPC ...... G06F 15/82; G06F 15/8053; G06F 17/10; G06F 17/153; G06F 17/18

USPC .......................................................... 707/756
See application file for complete search history.

(56) References Cited

U.S. PATENT DOCUMENTS

| | | | | |
|---|---|---|---|---|
| 2005/0044073 A1* | 2/2005 | Inokuchi | ............. | G06F 16/2465 |
| 2008/0275651 A1* | 11/2008 | Radivojac | .............. | G16B 40/00 |
| | | | | 702/19 |
| 2014/0344207 A1* | 11/2014 | Maruhashi | ............. | G06N 7/005 |
| | | | | 706/52 |

OTHER PUBLICATIONS

Lugo-Martinez et al., "Generalized graphlet kernels for probabilistic inference in sparse graphs", Network Science, pp. 254-276, 2014.*

(Continued)

*Primary Examiner* — Monica M Pyo
(74) *Attorney, Agent, or Firm* — Fujitsu Patent Center

(57) ABSTRACT

A data transformation apparatus selects items one by one and generates a first weight dataset and a second weight dataset on the basis of similarity between first records in a first dataset and second records in a second datasets. The first records and second records respectively include first item values and second item values that belong to the selected item. Based on the first weight dataset, the data transformation apparatus transforms the first dataset into a first similarity-determining dataset including third records. Each third record includes a numerical value that indicates a relationship between transformed item values belonging to different items. Further, based on the second weight dataset, the data transformation apparatus transforms the second dataset into a second similarity-determining dataset including fourth records. Each fourth record includes a numerical value that indicates a relationship between transformed item values belonging to different items.

6 Claims, 18 Drawing Sheets

(56) References Cited

OTHER PUBLICATIONS

Maruhashi et al., "MultiAspectForensics: mining large heterogeneous networks using tensor", Int. J. Web Engineering and Technology, vol. 7, No. 4, 2012.*

Rakesh et al., "Learning on graphs using Orthonormal Representation is Statistically Consistent", Neural Information Processing System, 10 pages, 2014.*

Eimi Shiotsuki et al., "Learning for Graph Classification using Star Edit Distance", DEIM Forum 2016 D2-1, Feb. 29, 2016, w/English translation (26 pages).

* cited by examiner

FIG. 7

| | 121 UNIT PERIOD LOG | | |
|---|---|---|---|
| | SRC HOST (TERM S) | DEST HOST (TERM R) | QTY |
| → | S1 | R1 | 1 |
| → | S2 | R1 | 0 |
| → | S1 | R2 | 1 |
| → | S2 | R2 | 1 |

VALUE → S1

S1×R1 → 1

RELATIONSHIPS

VARIABLES

FIG. 9   UPDATING TRANSFORM MATRIX FOR TERM S

Generate intermediate datasets by solely transforming variables other than Term S

53 INTERMEDIATE DATASET (FROM FIRST DATASET)

| TERM S | TERM R | QTY |
|---|---|---|
| S1 | R'1 | -1.27 |
| S2 | R'1 | -0.95 |
| S1 | R'2 | -0.62 |
| S2 | R'2 | 0.33 |

$v1_1 = (-1.27, -0.62)$
$v2_1 = (-0.95, 0.33)$

S1×R'1 = (-0.32)×S1×R1 + (-0.94)×S1×R2
S2×R'1 = (-0.32)×S2×R1 + (-0.94)×S2×R2
S1×R'2 = (-0.94)×S1×R1 + (0.32)×S1×R2
S2×R'2 = (-0.94)×S2×R1 + (0.32)×S2×R2

54 INTERMEDIATE DATASET (FROM SECOND DATASET)

| TERM S | TERM R | QTY |
|---|---|---|
| S1 | R'1 | -0.98 |
| S2 | R'1 | -0.18 |
| S1 | R'2 | 0.18 |
| S2 | R'2 | -0.98 |

$v1_2 = (-0.98, 0.18)$
$v2_2 = (-0.18, -0.98)$

S1×R'1 = (-0.98)×S1×R1 + (-0.18)×S1×R2
S2×R'1 = (-0.98)×S2×R1 + (-0.18)×S2×R2
S1×R'2 = (0.18)×S1×R1 + (-0.98)×S1×R2
S2×R'2 = (0.18)×S2×R1 + (-0.98)×S2×R2

61 SIMILARITY MATRIX

|  | SECOND DATASET | |
|---|---|---|
| FIRST DATASET | S1 | S2 |
| S1 | 1.14 ($v1_1 \cdot v1_2$) | 0.83 ($v1_1 \cdot v2_2$) |
| S2 | 0.99 ($v2_1 \cdot v1_2$) | -0.15 ($v2_1 \cdot v2_2$) |

41a TRANSFORM MATRIX (FOR FIRST DATASET)

|  | S'1 | S'2 |
|---|---|---|
| S1 | -0.85 | -0.53 |
| S2 | -0.53 | 0.85 |

43a TRANSFORM MATRIX (FOR SECOND DATASET)

|  | S'1 | S'2 |
|---|---|---|
| S1 | -0.92 | 0.39 |
| S2 | -0.39 | -0.92 |

Generate new transform matrixes such that they will have the closest resemblance to similarity matrix when they are multiplied together into a single matrix FIG. 15
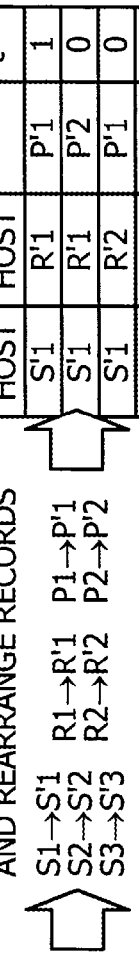
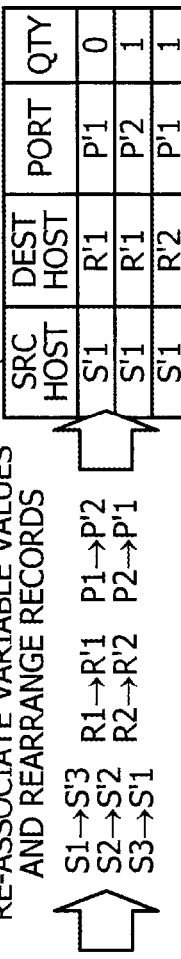
*RELATED ART*

METHOD AND APPARATUS FOR TRANSFORMING DATA

CROSS-REFERENCE TO RELATED APPLICATION

This application is based upon and claims the benefit of priority of the prior Japanese Patent Application No. 2016-193267, filed on Sep. 30, 2016, the entire contents of which are incorporated herein by reference.

FIELD

The embodiments discussed herein relate to a data transformation method and a data transformation apparatus.

BACKGROUND

Meaningful information may be extracted from large datasets by searching for patterns in them. Relationships and interactions between humans or objects are recorded, and collections of such data records are subjected to a process of classification analysis. For example, communication logs may record source hosts, destination hosts, port numbers, and other information about communication events. Bank transaction logs may register source accounts, destination accounts, branch office names, and other things related to monetary transactions. These logs are subjected to a classification analysis. In the case of communication logs, the records are analyzed in terms of, for example, whether they suggest any illegal or criminal activities. The analysis may discover a particular pattern of events in communication logs collected at the time of distributed denial-of-service (DDoS) attacks, targeted threats, or the like. In the case of bank transaction logs, the records are analyzed in terms of whether they suggest the occurrence of money laundering or money-transfer frauds. The analysis may discover a particular pattern of events in transaction logs collected at the time of such crimes.

Support vector machines (SVMs) are one of the techniques used for data classification analysis. An SVM algorithm determines a boundary plane that divides two classes with maximum distances to the closest data records. The similarity between data records is evaluated when classifying data records.

As an example of classification analysis on human or object relationships, a computer may calculate the similarity between a first communication log collected in a certain time window and a second communication log collected in another time window. Communication logs include multiple records, and each record includes a numerical value that indicates the number of communication events performed between a source host and a destination host.

The computer evaluates the overall similarity between two communication logs by associating their individual data records on a one-to-one basis and calculating a difference in the above-noted numerical values between each two associated records. How to best associate data records in two logs is, however, often unknown in the case of interactions between humans or objects. For example, the hosts involved in suspicious communication patterns may differ from log to log. That is, comparing the records that have identical source hosts and identical destination hosts is not a best practice for similarity determination. Accordingly, the computer determines record-to-record associations to maximize the similarity between datasets of interest. However, if an exhaustive approach was taken in this case, the computer would see an explosion in the number of possible association patterns, thus being unable to achieve the goal within a realistic time frame.

Graph kernels (e.g., random walk kernel and shortest path kernel) are techniques for efficiently calculating the similarity of pairs of graphs. Recorded relationships between humans or objects may be represented in the form of graph data, which allows the use of a graph kernel to classify them. As one example of graph-based data classification techniques, a graph edit distance kernel is proposed to improve the accuracy of measurement of similarity between two graphs by using graph mapping distance as an approximation of graph edit distance. See, for example, the document below:

Eimi Shiotsuki, Akihiro Inokuchi, "Learning for graph classification using Star edit distance", DEIM Forum 2016, Feb. 29, 2016

While the graph kernels make it possible to measure the similarity with a small amount of computation, the drawback is that they could lose some part of the original data and thus degrade the accuracy of similarity determination. For example, in the case of communication log analysis, it is not possible to express the combinations of source host, destination host, and port number in graph form. That is, graph kernels are unable to maintain the information about combinations of three interrelated things. The existing methods are unable to provide sufficient accuracy in determining similarity between data records describing relationships between humans or things, although it may be possible to execute the calculation with a reasonable amount of computation.

SUMMARY

In one aspect, there is provided a non-transitory computer-readable storage medium storing therein a data transformation program that causes a computer to perform a procedure including: obtaining a first dataset and a second dataset, the first dataset being a collection of first records each including a numerical value that indicates a relationship between two or more first item values belonging to a plurality of different items, the second dataset being a collection of second records each including a numerical value that indicates a relationship between two or more second item values belonging to the plurality of different items; selecting one of the plurality of different items so as to divide the first item values into selected first item values and non-selected first item values, as well as the second item values into selected second item values and non-selected second item values; calculating similarity between relationships of the selected first item values with the non-selected first item values in the first dataset and relationships of the selected second item values with the non-selected second item values in the second dataset; generating, based on the calculated similarity, a first weight dataset that indicates influence of the selected first item values on a subset of transformed item values that belongs to the selected item, as well as a second weight dataset that indicates influence of the selected second item values on the subset of transformed item values that belongs to the selected item; repeating the calculating of similarity and the generating of a first weight dataset and a second weight dataset, while changing the selected item; transforming the first dataset into a first similarity-determining dataset, based on the first weight datasets generated for the plurality of different items as a result of the repeating, the first similarity-determining dataset being a collection of third records each including a numerical value that indicates a relationship between two or more of the transformed item values belonging to the plurality of different items; and transforming the second dataset into a second similarity-determining dataset, based on the second weight datasets generated for the plurality of different items as a result of the repeating, the second similarity-determining dataset being a collection of fourth records each including a numerical value that indicates a relationship between two or more of the transformed item values belonging to the plurality of different items.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates replacement of communication logs with variables by way of example;

FIG. 9 illustrates an example of an update of transform matrixes for Term S;

FIGS. 15 and 16 are first and second diagrams illustrating an example of similarity calculation for comparison purposes.

DESCRIPTION OF EMBODIMENTS

Several embodiments will be described below with reference to the accompanying drawings. These embodiments may be combined with each other, unless they have contradictory features.

(a) First Embodiment

Figure 1:
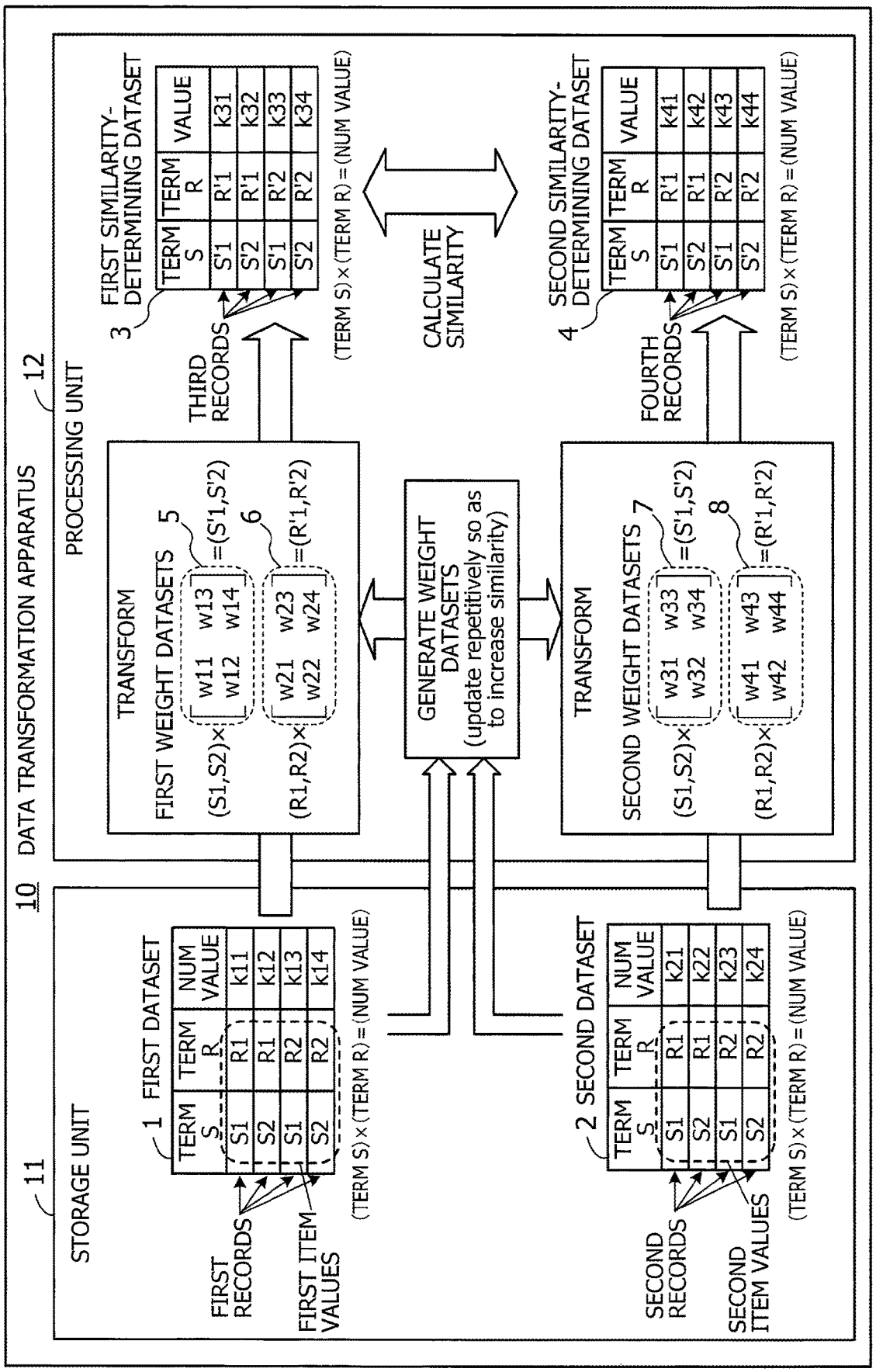
FIG. 1 illustrates an example of a data transformation apparatus according to a first embodiment.

The description begins with a first embodiment. FIG. 1 illustrates an example of a data transformation apparatus according to a first embodiment. The illustrated data transformation apparatus 10 includes a storage unit 11 and a processing unit 12 to execute a data transformation method described below. For example, the data transformation apparatus 10 may be a computer configured to execute a data transformation program. The storage unit 11 is a memory or other storage device installed in the data transformation apparatus 10. The processing unit 12 is a processor of the data transformation apparatus 10.

The storage unit 11 stores a first dataset 1 and a second dataset 2 as the source data for similarity calculation. The first dataset 1 is a collection of first records, each having a numerical value (k11 to k14) that indicates a relationship between two or more first item values (S1 and S2 for "Term S", R1 and R2 for "Term R"). Here, each first item value in the first records belongs to one of a plurality of items (Term S and Term R), and the two or more first item values in an individual record respectively belong to different items. Likewise, the second dataset 2 is a collection of second records, each having a numerical value (k21 to k24) that indicates a relationship between two or more second item values (S1 and S2 for Term S, R1 and R2 for Term R). Each second item value in the second records belongs to one of a plurality of items (Term S and Term R), and the two or more second item values in an individual second record respectively belong to different items.

The processing unit 12 selects the items (Term S, Term R) one by one and calculates similarity relating to the first dataset 1 and second dataset 2 as follows. When one item is selected, the first item values in the first dataset are divided accordingly into two groups: selected first item values and non-selected first item values (depending on whether they belong to the selected item). The second item values in the second dataset 2 are also divided into two groups: selected second item values and non-selected second item values. The processing unit 12 then calculates the similarity between (i) relationships of the selected first item values with the non-selected first item values in the first dataset 1 and (ii) relationships of the selected second item values with the non-selected second item values in the second dataset 2.

Based on the similarity calculated above, the processing unit 12 generates first weight datasets 5 and 6 and second weight datasets 7 and 8. The first weight datasets 5 and 6 indicate how much influence the selected first item values has on "selected transformed item values." The second weight datasets 7 and 8 indicate how much influence the selected second item values has on the same. Here the term "selected transformed item values" refers to a subset of transformed item values (S'1, S'2, R'1, R'2) of the items (Term S, Term R), and more particularly, the subset belongs to the selected item of interest.

Suppose, for example, that the processing unit 12 selects "Term S" to place its focus. The processing unit 12 generates a first weight dataset 5 and a second weight dataset 7 for the selected item "Term S." Here the first dataset 1 includes item values S1 and S2 belonging to Term S, and the second dataset 2 similarly includes item values S1 and S2 belonging to Term S. The weight values in the first weight dataset 5 are determined such that each pair of a term-S item value in the first dataset 1 and a term-S item value in the second dataset 2 may maintain the similarity in terms of its relationships with other items. Likewise, the weight values in the second weight dataset 7 are determined such that each pair of a term-S item value in the first dataset 1 and a term-S item value in the second dataset 2 may maintain the similarity in terms of relationships with other items. When item "Term R" is selected, the processing unit 12 generates another first weight dataset 6 and another second weight dataset 8 in a similar manner, but for term-R item values.

To calculate the similarity between selected first item values and selected second item value, the processing unit 12 generates an initial version of first weight datasets 5 and 6 and second weight datasets 7 and 8 for individual items Term S and Term R. Then, based on the non-selected first weight dataset(s) and non-selected second weight dataset(s) generated for other item(s) than the selected item, the processing unit 12 calculates similarity between selected first item values in the first dataset 1 and selected second item values in the second dataset 2.

The processing unit 12 may repeat the above process of selecting items, Term S and Term R, and re-generating first and second weight datasets 5 and 6 until a specific end condition is met. For example, the processing unit 12 calculates the similarity between selected first item values and their corresponding selected second item values by using non-selected first and second weight datasets and updates weight datasets for the selected item according to the calculated similarity.

For example, the processing unit 12 selects Term S and calculates similarity between item values S1 and S2 in the first dataset 1 and item values S1 and S2 in the second dataset 2, using the first weight dataset 6 previously generated for Term R. The processing unit 12 then updates the first weight dataset 5 and second weight dataset 7 for Term S on the basis of the calculated similarity. The processing unit 12 further updates the first weight dataset 6 and second weight dataset 8 for Term R by using the updated first weight dataset 5 and second weight dataset 7.

The processing unit 12 repeats updating the first weight datasets 5 and 6 and second weight datasets 7 and 8 in the way described above. The first weight datasets 5 and 6 and second weight datasets 7 and 8 are optimized as a result of repetitive updates, so that a closer similarity will be attained between first and second similarity-determining datasets 3 and 4 when they are produced.

The processing unit 12 transforms the first dataset 1 to a first similarity-determining dataset 3 on the basis of the first weight datasets 5 and 6 generated for Term S and Term R. The first similarity-determining dataset 3 is a collection of third records that respectively include numerical values k31 to k34, each representing a relationship between two or more transformed item values (S'1, S'2, R'1, R'2) that belong to different items. The processing unit 12 also transforms the second dataset 2 to a second similarity-determining dataset 4 on the basis of the second weight datasets 7 and 8 generated for Term S and Term R. The second similarity-determining dataset 4 is a collection of fourth records that respectively include numerical values k41 to k44, each representing a relationship between two or more transformed item values (S'1, S'2, R'1, R'2) that belong to different items.

The processing unit 12 further calculates the similarity between the above-noted numerical values in the third records and their counterparts in the fourth records. The processing unit 12 executes this similarity calculation as to the first and second similarity-determining datasets 3 and 4, each time an update version is generated for the first weight datasets 5 and 6 and second weight datasets 7 and 8. The processing unit 12 detects the maximum value of similarity in these updates and uses that value as the similarity between the first dataset 1 and second dataset 2.

As can be seen from the above, the similarity between first and second datasets 1 and 2 is evaluated with accuracy by calculating it after transforming the first and second datasets 1 and 2 using first weight datasets 5 and 6 and second weight datasets 7 and 8. In other words, the similarity in terms of relationships of one item with other item(s) is reflected upon first weight datasets 5 and 6 and second weight datasets 7 and 8 corresponding to that one item. The higher the noted similarity is, the closer the first similarity-determining dataset 3 and second similarity-determining dataset 4 become. This results in an improved accuracy of similarity determination.

The proposed method does not incur too much increase in computational loads, let alone combinatorial explosion. Rather, the similarity calculation process may be performed with a reasonable amount of computational power. For example, the following description presents a matrix-based implementation of similarity calculation according to the first embodiment.

The processing unit 12 uses vectors to express relationships of item values between a specific item and other items. The processing unit 12 then transforms the first dataset 1 and second dataset 2 into first similarity-determining dataset 3 and second similarity-determining dataset 4 while maintaining the distance between vectors corresponding to two item values. For this transformation, the processing unit 12 generates matrixes that serve as the first weight datasets 5 and 6 and second weight datasets 7 and 8. The following part of the description uses the term "transform matrix" to refer to the first weight datasets 5 and 6 and second weight datasets 7 and 8 in matrix form.

The processing unit 12 detects the maximum value of similarity between the first similarity-determining dataset 3 and second similarity-determining dataset 4 and takes that value as the similarity between the first dataset 1 and second dataset 2. This feature enables similarity calculation based on basic structure of relationships, as will be described in detail below.

For simplicity purposes, the description assumes that both the first dataset 1 and second dataset 2 have only two items. The processing unit 12 expresses the first dataset 1 and second dataset 2 in the form of matrixes $X_1$ and $X_2$, respectively. The rows of each matrix $X_1$ and $X_2$ correspond to item values "S1" and "S2" in one item "Term S," and the columns of each matrix $X_1$ and $X_2$ correspond to item values "R1" and "R2" in the other item "Term R." Each element (component) of matrixes X1 and X2 has a numerical value that represents a relationship between the term-S item value corresponding to its row position and the term-R item value corresponding to its column position.

The first dataset 1 may be different from the second dataset 2 in the number of item values of Term S. In that case, the processing unit 12 equalizes their numbers by adding as many dummy item values as needed to the dataset that lacks item values. The processing unit 12 does the same for term-R item values when it is needed.

The processing unit 12 uses square matrixes $C_{11}$ and $C_{12}$ to represent transform matrixes (or first weight datasets 5 and 6) for Term S and Term R in the first dataset 1. Similarly, the processing unit 12 uses square matrixes $C_{21}$ and $C_{22}$ to represent transform matrixes (or second weight datasets 7 and 8) for Term S and Term R in the second dataset 2. Note that all of these matrixes $C_{11}$, $C_{12}$, $C_{21}$, and $C_{22}$ satisfy the following orthonormality conditions.

$$C_{11}{}^T C_{11} = C_{21}{}^T C_{21} = I$$

$$C_{12}{}^T C_{12} = C_{22}{}^T C_{22} = I \qquad (1)$$

Here the symbol I represents an identity matrix, which is a square matrix with ones on the main diagonal and zeros elsewhere. Let $x_{1a}$ and $x_{1b}$ be column vectors constituting matrix $X_1$. These vectors $x_{1a}$ and $x_{1b}$ respectively represent relationships of term-R variable values "a" and "b" with Term S. Specifically, the following relationship holds.

$$\|C_{11}{}^T x_{1a} - C_{11}{}^T x_{1b}\|^2 = \|x_{1a} - x_{1b}\|^2 \tag{2}$$

This equation (2) means that the transformation of $X_1$ by $C_{11}$ does not vary the distance between vectors that represent relationships between item values and other item(s). The same is true for other transform matrixes $C_{12}$, $C_{21}$, and $C_{22}$ as well.

The processing unit 12 updates transform matrixes $C_{11}$ and $C_{21}$ so as to maximize the similarity between datasets while fixing other transform matrixes $C_{12}$ and $C_{22}$. The similarity $E(X_1, X_2)$ between datasets is expressed by the following formula.

$$E(X_1, X_2) = \langle C_{11}{}^T X_1 C_{12}, C_{21}{}^T X_2 C_{22} \rangle \tag{3}$$

Matrixes $C_{11}$ and $C_{21}$ that maximize the above similarity is obtained through a singular value decomposition presented below.

$$C_{11} S C_{21}{}^T = X_1 C_{12} C_{22}{}^T X_2{}^T \tag{4}$$

S is a square diagonal matrix having non-negative values.

The processing unit 12 calculates similarity in this way by efficiently transforming data values using matrix operations.

The example of FIG. 1 depicts first weight datasets 5 and 6 and second weight datasets 7 and 8 in the form of transform matrixes. Referring to, for example, the first-row first-column component of the first weight dataset 5, the weight value w11 indicates how much the item value S1 in Term S of the first dataset 1 influences transformed item value S'1 in the first similarity-determining dataset 3. Such transformed item values are obtained by right-multiplying a row vector formed from item values of a specific item in the first dataset 1 by a transform matrix. For example, a row vector (S1, S2) is formed from term-S item values in the first dataset 1. The processing unit 12 right-multiples this vector (S1, S2) by a transform matrix of the first weight dataset 5 for Term S, thus yielding a transformed row vector (S'1, S'2) that gives transformed item values in Term S.

Similarly, a row vector (R1, R2) is formed from term-R item values in the first dataset 1. The processing unit 12 right-multiples this vector (R1, R2) by a transform matrix of the first weight dataset 6 for Term R, thus yielding a transformed row vector (R'1, R'2) that gives transformed item values in Term R. The processing unit 12 also performs the same on the second dataset 2. That is, a row vector (S1, S2) is formed from term-S item values in the second dataset 2. The processing unit 12 right-multiples this vector (S1, S2) by a transform matrix of the second weight dataset 7 for Term S, thus yielding a transformed row vector (S'1, S'2) that gives transformed item values in Term S. Likewise, a row vector (R1, R2) is formed from term-R item values in the second dataset 2. The processing unit 12 right-multiples this vector (R1, R2) by a transform matrix of the second weight dataset 8 for Term R, thus yielding a transformed row vector (R'1, R'2) that gives transformed item values in Term R.

Each record in the first and second datasets 1 and 2 has a data field named "numerical value" ("NUM VALUE" in FIG. 1). It is assumed that the numerical value field of a record contains the term-S item value multiplied by the term-R item value in the same record. Each record in the first and second similarity-determining datasets 3 and 4 has a data field named "numerical value," which is assumed to contain the term-S item value multiplied by the term-R item value in the same record. The numerical values in the first and second similarity-determining datasets 3 and 4 are obtained through calculations. For example, the topmost record of S'1 and R'1 in the first similarity-determining dataset 3 in FIG. 1 has a numerical value of k31, which is calculated as follows:

$$\begin{aligned} k31 &= S'1 \times R'1 \\ &= (w11 \times S1 + w12 \times S2) \times (w21 \times R1 + w22 \times R2) \\ &= w11 \times w21 \times S1 \times R1 + w12 \times w21 \times S2 \times R1 + \\ &\quad w11 \times w22 \times S1 \times R2 + w12 \times w22 \times S2 \times R2 \\ &= w11 \times w21 \times k11 + w12 \times w21 \times k12 + w11 \times w22 \times k13 + \\ &\quad w12 \times w22 \times k14 \end{aligned}$$

Other numerical values k31 to k34 and k41 to k44 in the first and second similarity-determining datasets 3 and 4 may be calculated in a similar manner.

The processing unit 12 evaluates the similarity between the first similarity-determining dataset 3 and second similarity-determining dataset 4 by comparing their respective numerical value fields. For example, the processing unit 12 considers numerical values in the first similarity-determining dataset 3 as the components of a vector, and those in the second similarity-determining dataset 4 as the components of another vector. The processing unit 12 calculates an inner product of the two vectors. This inner product represents the similarity between the first similarity-determining dataset 3 and second similarity-determining dataset 4.

The above example has demonstrated how the matrixes of first weight datasets 5 and 6 and second weight datasets 7 and 8 are used in similarity calculation. The use of matrixes simplifies the calculation.

While the above description has assumed that the first dataset 1 and second dataset 2 have only two items for simplicity purposes, the number of items may be much larger than two in real-world problems. The similarity calculation is made possible in such cases by expansion from matrix to tensor. Matrix is an example of tensor.

Let tensors $X_m$ and $X_n$ represent datasets to be compared, where m and n are integers for distinguishing datasets. $X_m$ and $X_n$ include k items, where k is an integer greater than one. Transform matrix $C_k$ is defined for transformation of a dataset into another dataset for the purpose of similarity evaluation. This transformation is expressed as follows.

$$X_n \prod_k \times_k C_k \tag{5}$$

The symbol $X_k$ in transformation (5) represents a mode product of tensors. The result of transformation (5) is used to express the distance between tensors $X_m$ and $X_n$ as follows.

$$E(X_m, X_n) = \|X_m\|_2 + \|X_n\|_2 - 2\left\langle X_m, X_n \prod_k \times_k C_k \right\rangle \tag{6}$$

Matrix $C_k$ that minimizes the distance given in equation (6) serves as a transform matrix, where $C_k$ is supposed to satisfy the following orthonormality conditions.

$$\begin{cases} C_k^T C_k = I(I_{kn} \geq I_{km}) \\ C_k C_k^T = I(I_{kn} < I_{km}) \end{cases} \quad (7)$$

Then item-specific versions of $C_k$ are calculated by repetitively performing the following singular value decomposition for each item.

$$P_k S_k Q_k^T = \left( X_n \prod_{\substack{k'=1,\ldots,K \\ k' \neq k}} \times_{k'} C_{k'} \right)^{(k)T} X_m^{(k)} \quad (8)$$

where (k) denotes the operation of transforming a tensor to a matrix whose columns represent the k-th item and whose rows represent other items.

The above equation (8) gives matrixes $P_k$, $S_k$, and $Q_k^T$. With matrixes $P_k$ and $Q_k^T$, the processing unit 12 obtains matrix $C_k$ as follows.

$$C_k = P_k Q_k^T \quad (9)$$

The processing unit 12 calculates transform matrixes in the above way. As a result of its data transformation using such matrixes, the first embodiment provides a realistic solution for similarity calculation of datasets even if the datasets have three or more items.

(b) Second Embodiment

This part of the description explains a second embodiment. The second embodiment is to evaluate similarity between different datasets of communication logs.

Figure 2:
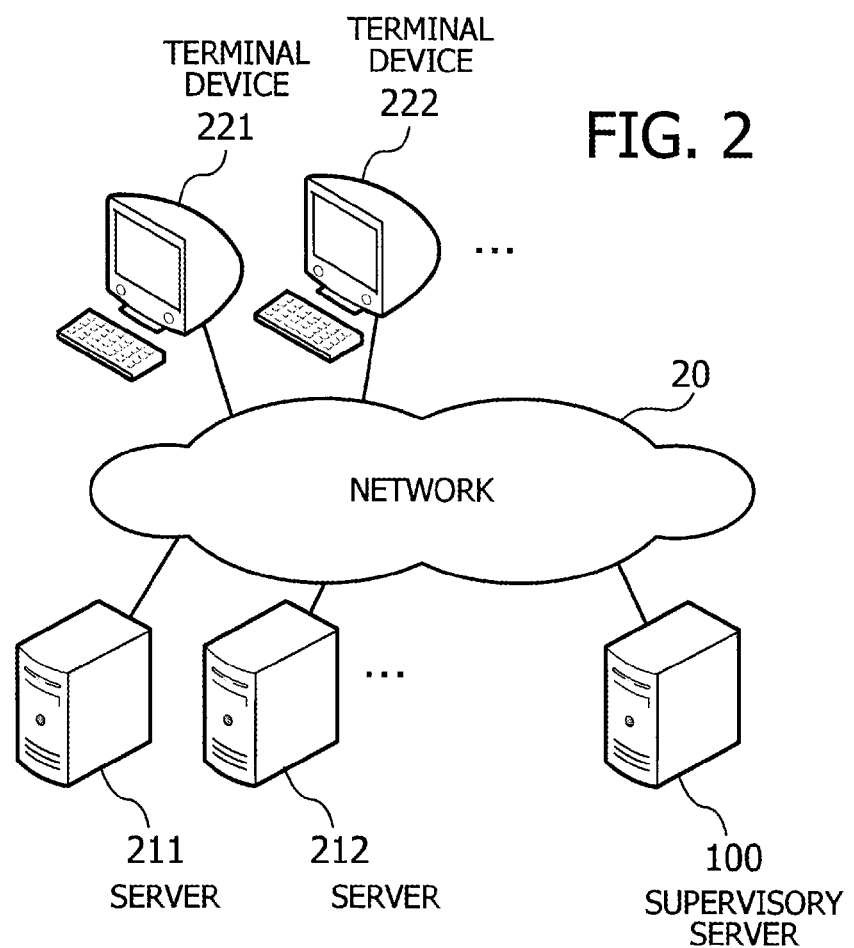
FIG. 2 illustrates an example of a system configuration according to a second embodiment.

FIG. 2 illustrates an example of a system configuration according to the second embodiment. The illustrated system includes servers 211, 212, . . . , terminal devices 221, 222, . . . , and supervisory servers 100, each being connected to a network 20. The servers 211, 212, . . . are computers that provide processing services upon request from terminal devices. Two or more of those servers 211, 212, . . . may work together to provide a specific service. The terminal devices 221, 222, . . . are users' computers that utilize services that the above servers 211, 212, . . . provide.

The supervisory server 100 supervises communication messages transmitted over the network 20 and records them in the form of communication logs. This collection of communication logs is performed in each unit time window, and the supervisory server 100 classifies those communication logs into separate classes. For example, the supervisory server 100 classifies log data according to whether any suspicious communication took place during a unit time window.

Figure 3:
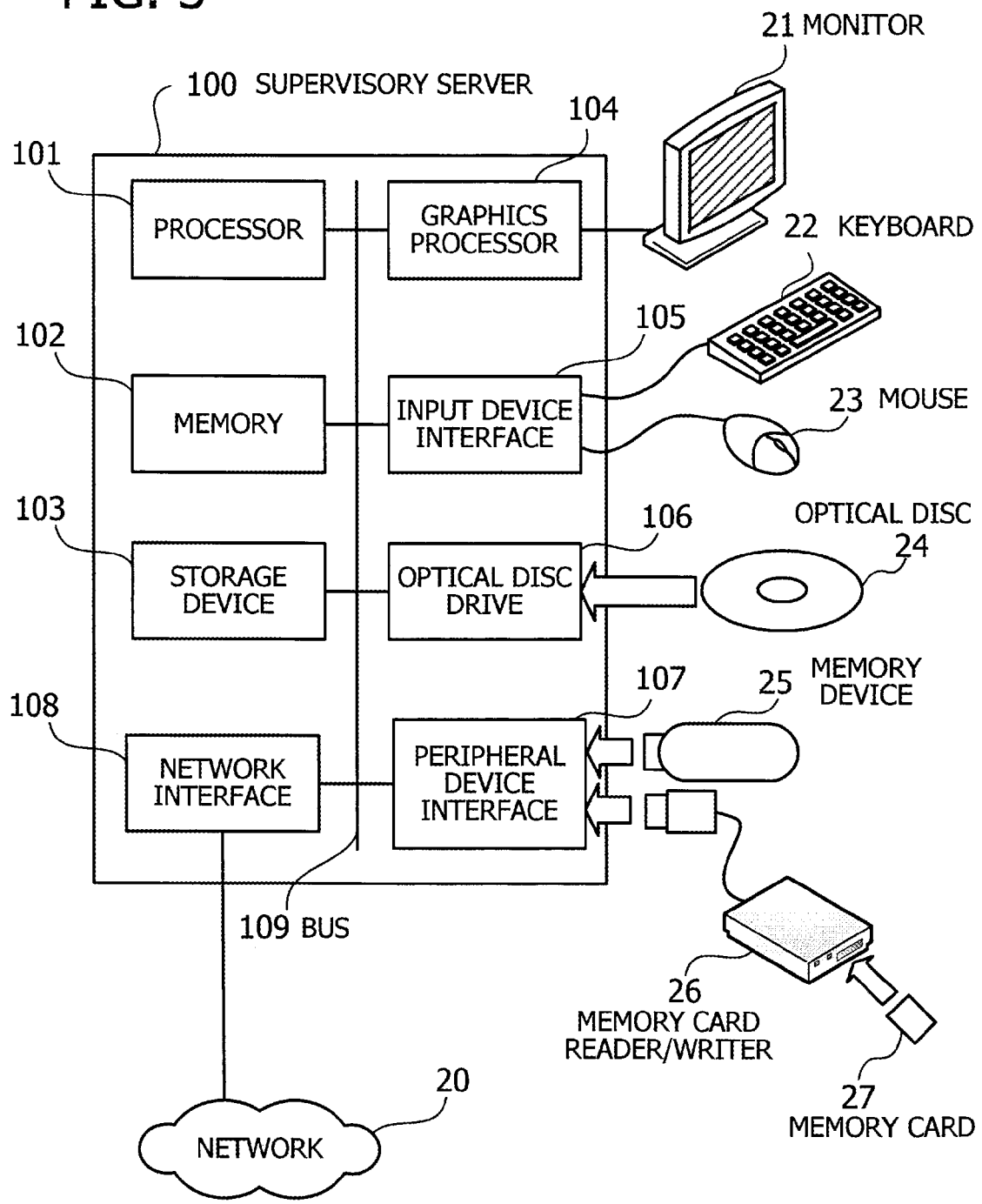
FIG. 3 illustrates an example of a hardware configuration of a supervisory server used in the second embodiment.

FIG. 3 illustrates an example of hardware configuration of a supervisory server used in the second embodiment. The illustrated supervisory server 100 has a processor 101 to control its entire operation. The processor 101 is connected to a memory 102 and other various devices and interfaces via a bus 109. The processor 101 may be a single processing device or a multiprocessor system including two or more processing devices, such as a central processing unit (CPU), micro processing unit (MPU), or digital signal processor (DSP). It is also possible to implement processing functions of the processor 101 and its programs wholly or partly into an application-specific integrated circuit (ASIC), programmable logic device (PLD), or other electronic circuits, or any combination of them.

The memory 102 serves as the primary storage device in the supervisory server 100. Specifically, the memory 102 is used to temporarily store at least some of the operating system (OS) programs and application programs that the processor 101 executes, as well as other various data objects that it manipulates at runtime. For example, the memory 102 may be implemented by using a random access memory (RAM) or other volatile semiconductor memory devices.

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the supervisory server 100 (as a computer) to store program and data files of the operating system and applications. For example, the storage device 103 may be implemented by using hard disk drives (HDD) or solid state drives (SSD).

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices, such as a keyboard 22 and a mouse 23 and supplies signals from these input devices to the processor 101. The mouse 23 is a pointing device, which may be replaced with other kind of pointing devices, such as a touchscreen, tablet, touchpad, and trackball.

The optical disc drive 106 reads out data encoded on an optical disc 24, by using laser light. The optical disc 24 is a portable data storage medium, the data recorded on which is read as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the supervisory server 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to a network 20 so as to exchange data with other computers or network devices (not illustrated).

The above-described hardware platform may be used to implement processing functions of the second embodiment. The same hardware configuration of the supervisory server 100 of FIG. 3 may similarly be applied to the foregoing data transformation apparatus 10 of the first embodiment.

The supervisory server 100 provides various processing functions of the second embodiment by, for example, executing computer programs stored in a non-transitory computer-readable storage medium. A variety of storage media are available for recording programs to be executed by the supervisory server 100. For example, the supervisory server 100 may store program files in its own storage device 103. The processor 101 reads out at least part of the programs stored in the storage device 103, loads them into the memory 102, and executes the loaded programs. Other possible storage locations for the server programs include an optical disc 24, memory device 25, memory card 27, and other portable storage medium. The programs stored in such a portable storage medium are installed in the storage device 103 under the control of the processor 101, so that they are ready to execute upon request. It may also be possible for the processor 101 to execute program codes read out of a portable storage medium, without installing them in its local storage devices.

The following part of the description explains what functions the supervisory server provides.

Figure 4:
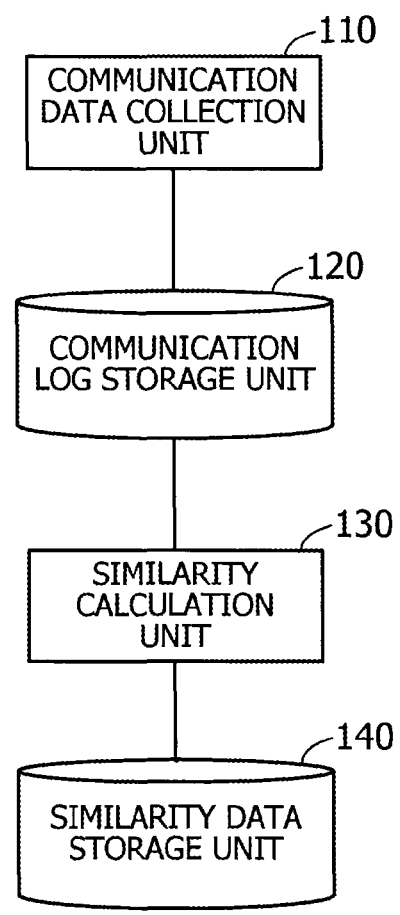
FIG. 4 is a block diagram illustrating an example of functions that the supervisory server provides.

FIG. 4 is a block diagram illustrating an example of functions that the supervisory server provides. Specifically, the illustrated supervisory server 100 includes a communication data collection unit 110, a communication log storage unit 120, a similarity calculation unit 130, and a similarity data storage unit 140.

The communication data collection unit 110 collects communication data (e.g., packets) transmitted and received over the network 20. For example, the communication data collection unit 110 collects packets passing through a switch placed in the network 20. More specifically, a copy of these packets is taken out of a mirroring port of the switch. It may also be possible for the communication data collection unit 110 to request servers 211, 212, . . . to send their respective communication logs. The communication data collection unit 110 stores the collected communication data in a communication log storage unit 120.

The communication log storage unit 120 stores therein the logs of communication data that the communication data collection unit 110 has collected. The stored data is called "communication logs."

The similarity calculation unit 130 calculates similarity between different communication logs collected in different unit periods. The similarity calculation unit 130 stores the calculated similarity values in the similarity data storage unit 140.

The similarity data storage unit 140 is a place to store information about similarity between different sets of data.

It is noted that the solid lines interconnecting functional blocks in FIG. 4 represent some of their communication paths. The person skilled in the art would appreciate that there may be other communication paths in actual implementations. Each functional blocks seen in FIG. 4 may be implemented as a program module, so that a computer executes the program module to provide its encoded functions.

Figure 5:
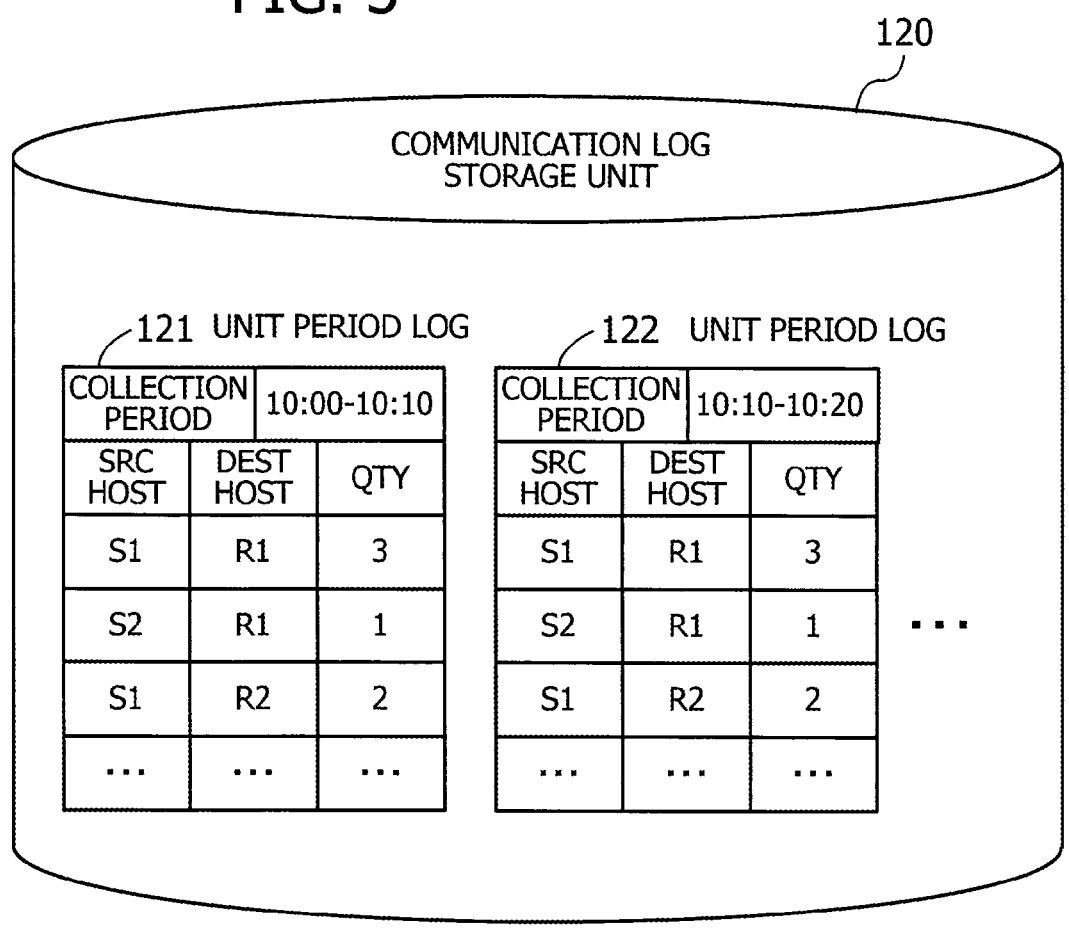
FIG. 5 illustrates an example of a communication log storage unit.

The following description now provides specifics of what is stored in the communication log storage unit 120. FIG. 5 illustrates an example of a communication log storage unit. The illustrated communication log storage unit 120 stores therein a plurality of unit period logs 121, 122, . . . , each containing information about the collection period of a communication log, followed by the communication data collected within the period.

Each record in the unit period logs 121, 122, . . . is formed from data fields named "Source Host" (SRC HOST), "Destination Host" (DEST HOST), and "Quantity" (QTY). The source host field contains an identifier that indicates the source host device of a packet, and the destination host field contains an identifier that indicates the destination host device of that packet. The quantity field indicates the number of communications that occurred between the same source host and the same destination host in the unit period log of interest. The unit period logs 121, 122, . . . may further have an additional data field to indicate which port was used for communication, such as destination Transmission Control Protocol (TCP)/User Datagram Protocol (UDP) port numbers.

The source host and destination host mentioned above as part of unit period logs 121, 122, . . . are an example of "items" discussed in the first embodiment. The quantity mentioned above is an example of "numerical value" discussed in the first embodiment.

Figure 6:
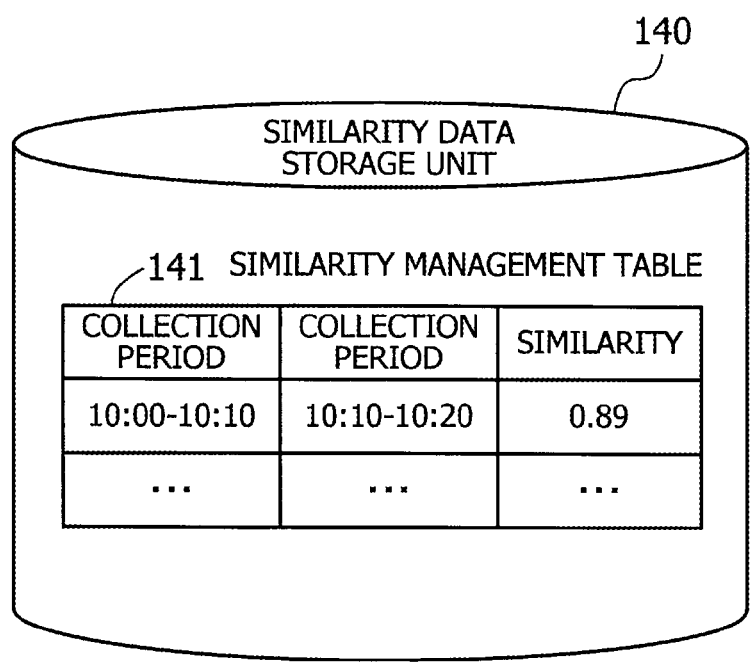
FIG. 6 illustrates an example of a similarity data storage unit.

FIG. 6 illustrates an example of a similarity data storage unit. The illustrated similarity data storage unit 140 stores therein a similarity management table 141, for example. The similarity management table 141 contains similarity information about two collection periods in comparative form. That is, each record in the similarity management table 141 describes similarity of communication logs, associated with a pair of two specific collection periods. The following description explains in detail how the similarity calculation unit 130 calculates similarity between unit period logs 121, 122, and so on.

The similarity calculation unit 130 calculates the similarity between unit period logs 121, 122, . . . , while taking the source hosts and destination hosts as variables. The following part of the description will use the term "variables" to refer to the "items" of datasets compared in the first embodiment, and the term "variable values" to refer to "item values" in the first embodiment.

FIG. 7 illustrates replacement of communication logs with variables by way of example. The similarity calculation unit 130 subjects a unit period log 121 to a similarity calculation process while regarding its source host, destination host, and quantity fields as three different variables. Specifically, the source host field is treated as variable "Term S," and the destination host field as variable "Term R." Each record in this input dataset represents a specific relationship pertaining to a specific combination of a source host and a destination host. The similarity calculation unit 130 regards their respective identifiers as variable values (i.e., the values of variables Term S and Term R). The similarity calculation unit 130 assumes that the variable value of "Term S" multiplied by the variable value of "Term R" equals the variable value of "Quantity" (Qty).

The similarity calculation unit 130 calculates the similarity between each given pair of input datasets. According to the second embodiment, the similarity calculation unit 130 transforms input datasets into intermediate datasets by using transform matrixes and calculates the similarity between the intermediate datasets.

Figure 8:
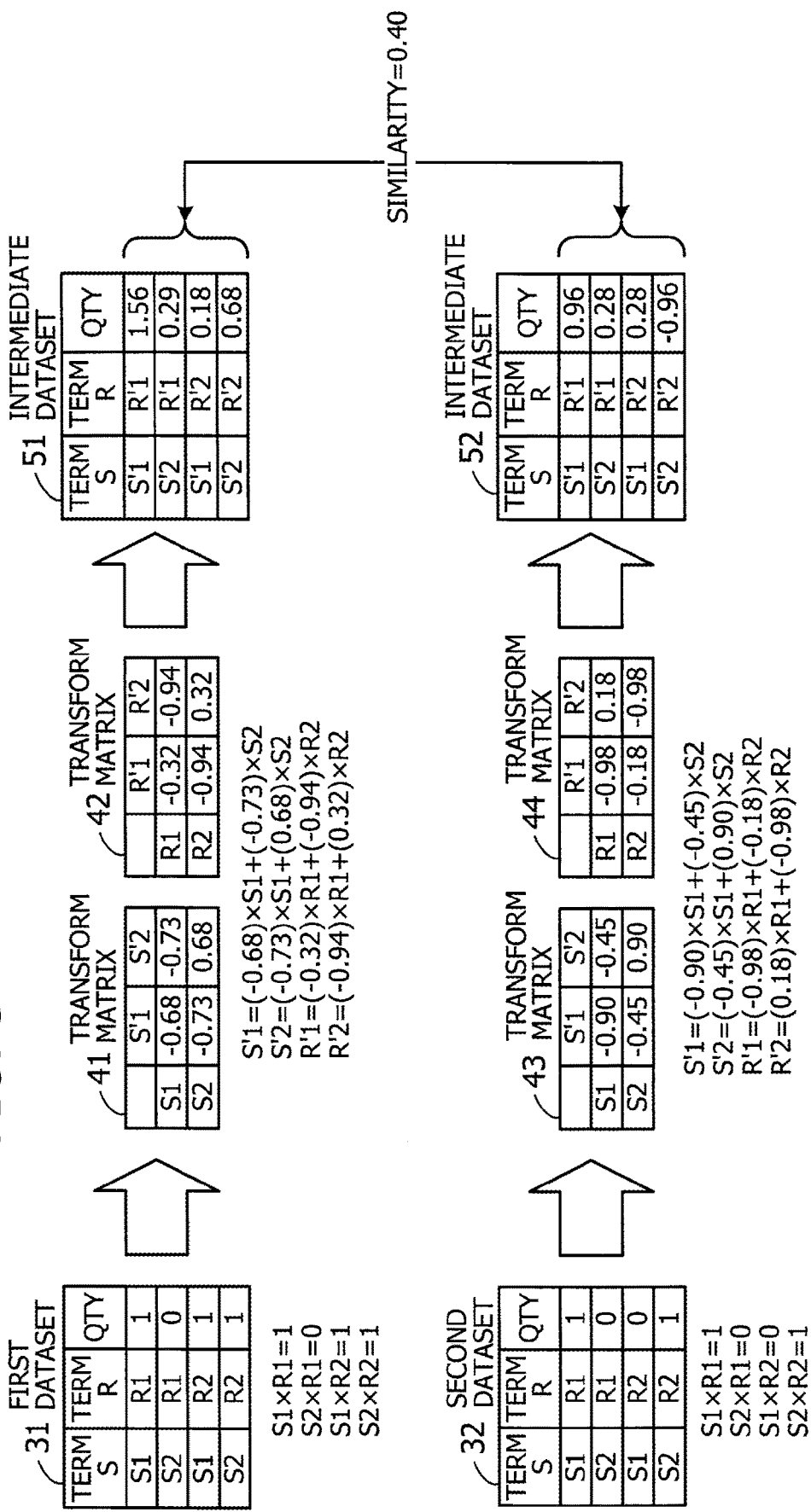
FIG. 8 illustrates an example of how the similarity is calculated between intermediate datasets produced with transform matrixes.

FIG. 8 illustrates an example of how the similarity is calculated between intermediate datasets produced with transform matrixes. Here the similarity calculation unit 130 generates as many transform matrixes 41 and 42 as the number of variables other than "Quantity" for use with a first dataset 31. The similarity calculation unit 130 also generates as many transform matrixes 43 and 44 as the number of variables other than "Quantity" for use with a second dataset 32. For example, the similarity calculation unit 130 generates a transform matrix 41 corresponding to "Term S," as well as a transform matrix 42 corresponding to "Term R," with respect to the first dataset 31. Likewise, the similarity calculation unit 130 generates a transform matrix 43 corresponding to "Term S," as well as a transform matrix 44 corresponding to "Term R," with respect to the second dataset 32.

Transform matrixes 41 to 44 are square matrixes with the dimensions of 2×2 (two rows and two columns) that satisfy the foregoing orthonormality conditions. Each row of the transform matrix 41 is associated with a particular variable value, S1 or S2, that the Term S field may take in the first dataset 31. Likewise, each row of the transform matrix 43 is associated with a particular variable value, S1 or S2, that the Term S field may take in the second dataset 32. Each column of the former transform matrix 41, on the other hand, is associated with a particular variable value, S'1 or S'2, that the Term S field may take in an intermediate dataset 51. Likewise, each column of the latter transform matrix 43 is associated with a particular variable value, S'1 or S'2, that the Term S field may take in another intermediate dataset 52. The component values in these two transform matrixes 41 and 43 each represent a weight that is used when a variable value, S1 or S2, in the corresponding row is transformed into a variable value, S'1 or S'2, in the corresponding column.

Referring now to variable Term R, each row of the transform matrix 42 is associated with a particular variable value, R1 or R2, that the Term R field may take in the first dataset 31. Each row of the transform matrix 44 is similarly associated with a particular variable value, R1 or R2, that the Term R field may take in the second dataset 32. Each column of the former transform matrix 42, on the other hand, is associated with a particular variable value, R'1 or R'2, that the Term R field may take in an intermediate dataset 51. Likewise, each column of the latter transform matrix 44 is associated with a particular variable value, R'1 or R'2, that the Term R field may take in an intermediate dataset 52. The component values in these two transform matrixes 43 and 44 each represent a weight that is used when a variable value, R1 or R2, in the corresponding row is transformed into a variable value, R'1 or R'2, in the corresponding column.

Referring to the example of FIG. 8, the weight values in the transform matrixes 41 to 44 are rounded off to two decimal places, but it is not intended to limit the second embodiment by that specific example. The transform matrix 41 to 44 may actually contain more decimal digits of weight values after the decimal point.

The similarity calculation unit 130 transforms the first dataset 31 into an intermediate dataset 51 by using a pair of transform matrixes 41 and 42. The intermediate dataset 51 holds quantity values corresponding to different combinations of variable values seen in the Term S and Term R fields. The variable in the Term S field of the intermediate dataset 51 has a value of S'1 or S'2, while the variable in the Term R field has a value of R'1 or R'2.

The quantity field of the intermediate dataset 51 contains the product of variable values in the Term S field and Term R field. The similarity calculation unit 130 calculates these quantity values for the intermediate dataset 51 by converting the given first dataset 31 with transform matrixes 41 and 42. For example, variable value S'1 is calculated by adding up the product of weight −0.68 and variable value S1 and the product of weight −0.73 and variable value S2. Variable value S'2 is calculated by adding up the product of weight −0.73 and variable value S1 and the product of weight −0.68 and variable value S2. Variable value R'1 is calculated by adding up the product of weight −0.32 and variable value R1 and the product of weight −0.94 and variable value R2. Variable value R'2 is calculated by adding up the product of weight −0.94 and variable value R1 and the product of weight 0.32 and variable value R2.

As can be seen from the above, the transform matrixes 41 and 42 permit variable values S'1, S'2, R'1, and R'2 to be expressed with variable values S1, S2, R1, and R2 and their respective weights. Accordingly, the product of a variable value S'1 or S'2 and another variable value R'1 or R'2 includes one or more of the terms S1×R1, S2×R1, S1×R2, and S2×R2. For example, the value of S'1×R'1 is expressed as follows:

$$S'1 \times R'1 = \{(-0.68 \times S1) + (-0.73 \times S2)\} \times \{(-0.32 \times R1) + (-0.94 \times R2)\}$$

$$= (-0.68) \times (-0.32) \times S1 \times R1 + (-0.73) \times (-0.32) \times S2 \times R1 + (-0.68) \times (-0.94) \times S1 \times R2 + (-0.73) \times (-0.94) \times S2 \times R2$$

The similarity calculation unit 130 substitutes the quantity values in the first dataset 31 for these product terms S1×R1, S2×R1, S1×R2, and S2×R2. The example of FIG. 8 assumes S1×R1=1, S2×R1=0, S1×R2=1, and S2×R2=1. The above-described calculation of products yields the quantity values for the intermediate dataset 51. The similarity calculation unit 130 similarly generates an intermediate dataset 52 by converting the second dataset 32 using relevant transform matrixes 43 and 44.

The similarity calculation unit 130 now calculates the similarity between the intermediate datasets 51 and 52 obtained above. For example, the variable values in the quantity field of the intermediate datasets 51 and 52 are considered as two vectors, and the similarity calculation unit 130 calculates an inner product of these vectors after normalizing their lengths to one. The similarity calculation unit 130 interprets the resulting inner product value as representing similarity of the two intermediate datasets 51 and 52.

The similarity between intermediate datasets 51 and 52 is calculated in the way described above. As the similarity value depends on the weights given by transform matrixes 41 to 44, the similarity calculation unit 130 updates the transform matrixes 41 to 44 so as to obtain a higher similarity. The updates take place alternately between two groups, i.e., transform matrixes 41 and 43 for Term S and transform matrixes 42 and 44 for Term R.

FIG. 9 illustrates an example of an update of transform matrixes for Term S. This example is to update two transform matrixes 41 and 43 for Term S. Here, the similarity calculation unit 130 generates intermediate datasets 53 and 54 by fixing the term-S variables and solely converting other variables. More specifically, the similarity calculation unit 130 converts term-R variable values R1 and R2 in the first dataset 31 using a transform matrix 42, thereby generating an intermediate dataset 53 as in the example of FIG. 9. The similarity calculation unit 130 also converts term-R variable values R1 and R2 in the second dataset 32 using another transform matrix 44, thereby generating another intermediate dataset 54. The quantity field of these intermediate datasets 53 and 54 represents the products obtained by multiplying S1 or S2 by R'1 or R'2. For example, the topmost record of the former intermediate dataset 53, corresponding to the first dataset 31, has a quantity value of S1×R'1, which is expressed as (−0.32)×S1×R1+(−0.94)×S1×R2 using weight values given in the transform matrix 42 for Term R. The quantity value of S1×R'1 is obtained by replacing S1×R1 and S1×R2 with their corresponding values in the first dataset 31.

Upon generation of intermediate datasets 53 and 54, the similarity calculation unit 130 calculates similarity between individual variables S1 and S2 in one intermediate dataset 53 and those in the other intermediate dataset 54. The calculated four similarity values are compiled into a similarity matrix 61. Each row of this similarity matrix 61 is associated with a term-S variable value in the first dataset 31, while each column of the same is associated with a term-S variable value in the second dataset 32. The component value in a specific row and a specific column of the similarity matrix 61 indicates similarity between two variable values respectively associated with the row and the column.

More specifically, the similarity calculation unit 130 generates several vectors from first and second intermediate datasets 53 and 54, each vector indicating relationships of one term-S variable value with term-R variable values. For example, vector $v1_1$ is produced from quantity values that represent relationships of variable value S1 in the intermediate dataset 53 with individual variable values R'1 and R'2. The similarity calculation unit 130 similarly generates vector $v2_1$ for another variable value S2 in the intermediate dataset 53. The similarity calculation unit 130 also performs the same things with another intermediate dataset 54. That is, the similarity calculation unit 130 generates vector $v1_2$ for a variable value S1, as well as vector $v2_2$ for another variable value S2, in the intermediate dataset 54.

The similarity calculation unit 130 then calculates an inner product of vectors $v1_1$ and $v1_2$ and enters it to the similarity matrix 61 as the similarity between S1 in the first dataset 31 and S1 in the second dataset 32. The similarity calculation unit 130 also calculates an inner product of vectors $v1_1$ and $v2_2$ and enters it to the similarity matrix 61 as the similarity between S1 in the first dataset 31 and S2 in the second dataset 32. The similarity calculation unit 130 further calculates an inner product of vectors $v2_1$ and $v1_2$ and enters it to the similarity matrix 61 as the similarity between S2 in the first dataset 31 and S1 in the second dataset 32. The similarity calculation unit 130 further calculates an inner product of vectors $v2_1$ and $v2_2$ and enters it to the similarity matrix 61 as the similarity between S2 in the first dataset 31 and S2 in the second dataset 32.

Based on the similarity matrix 61 described above, the similarity calculation unit 130 now generates a transform matrix 41a for transforming "Term S" in the first dataset 31 and a transform matrix 43a for transforming "Term S" in the second dataset 32. For example, the similarity calculation unit 130 generates transform matrixes 41a and 43a that exhibit the closest similarity to the similarity matrix 61 when they are combined into one matrix by eliminating their variables S'1 and S'2. More specifically, the similarity calculation unit 130 performs singular value decomposition on the similarity matrix 61 to generate transform matrixes 41a and 43a.

The similarity matrix 61 ultimately updates the term-S transform matrix 41 (FIG. 8) for the first dataset by replacing it with the new transform matrix 41a generated above. Also, the similarity matrix 61 ultimately updates the term-S transform matrix 43 (FIG. 8) for the second dataset 32 by replacing it with the new transform matrix 43a generated above.

The similarity calculation unit 130 updates term-S transform matrixes by fixing Term S and changing other variable(s) in the way described above. The same procedure may similarly be applied to variable Term R. That is, the similarity calculation unit 130 updates term-R transform matrixes by fixing Term R and changing other variable(s). Now that new transform matrixes are ready for both variables, the similarity calculation unit 130 generates intermediate datasets from the first dataset 31 and second dataset 32 by using the updated transform matrixes and evaluates the similarity between the resulting intermediate datasets. For example, the similarity calculation unit 130 repeats updating transform matrixes until the intermediate datasets exhibit a convergence of their similarity, thereby obtaining a similarity-maximizing set of transform matrixes. The obtained maximum similarity of intermediate datasets is then used as the similarity between the first dataset 31 and second dataset 32.

Figure 10:
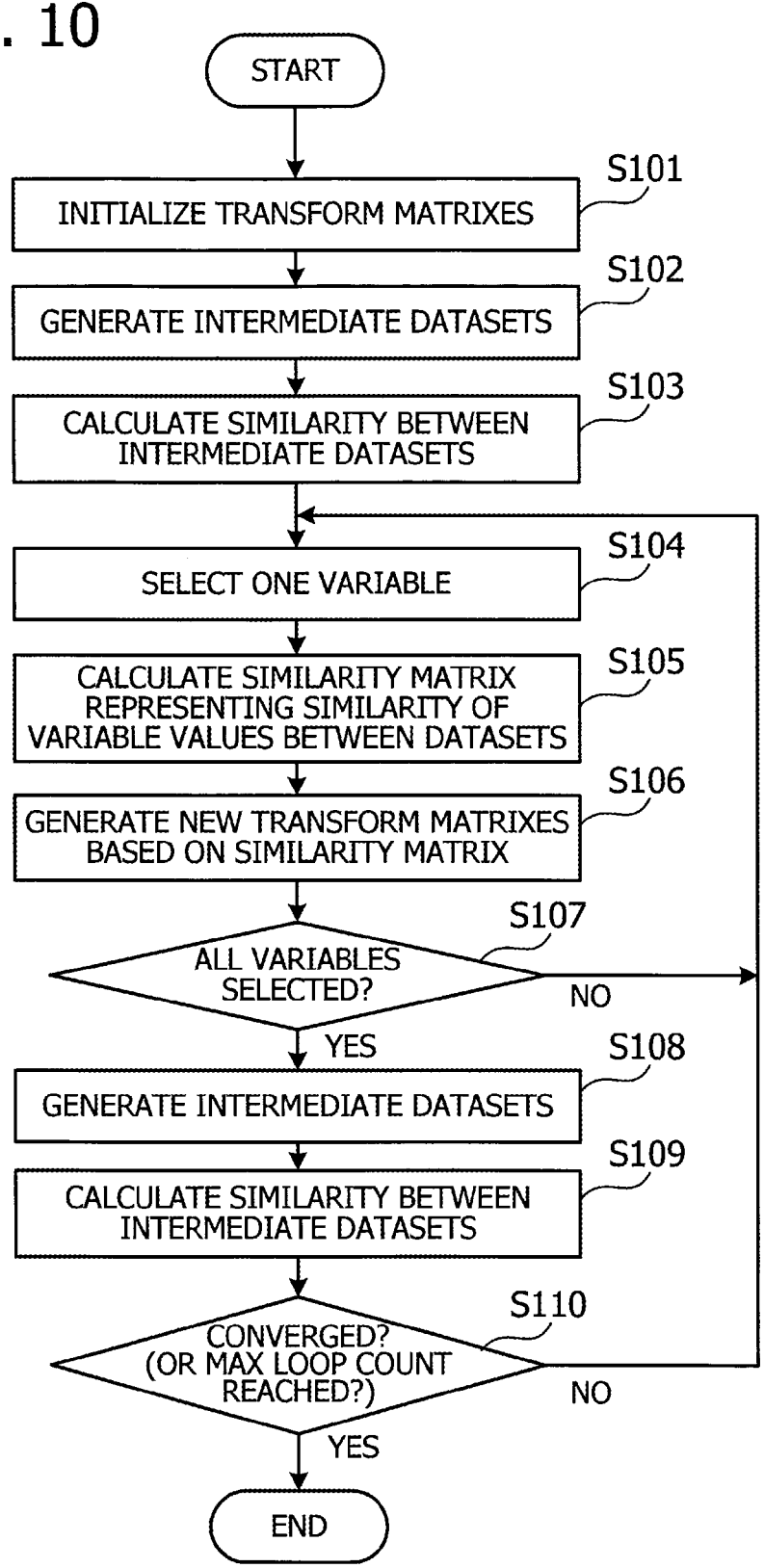
FIG. 10 is a flowchart illustrating an example of a similarity calculation process.

The process described above with reference to FIGS. 8 and 9 may be expressed in the form of a flowchart as in FIG. 10. FIG. 10 is a flowchart illustrating an example of a similarity calculation process. This similarity calculation process is executed upon receipt of two datasets for comparison purposes. Each operation in FIG. 10 is described below in the order of step numbers.

(Step S101) The similarity calculation unit 130 initializes transform matrixes. For example, the similarity calculation unit 130 generates an initial transform matrix for each individual variable other than "Quantity" in the datasets under classification analysis. Each generated transform matrix is a square matrix that has as many rows and columns as the number of values that the corresponding variable takes, where the same variable values are counted as one value. The transform matrixes may have random-valued elements as long as they satisfy the orthonormality conditions. For example, the similarity calculation unit 130 first assigns random values to some elements of the transform matrix of interest and then determines other elements to meet the orthonormality conditions.

(Step S102) Using the initial transform matrixes generated above, the similarity calculation unit 130 calculates intermediate datasets from the individual datasets under comparison.

(Step S103) The similarity calculation unit 130 calculates the similarity between the intermediate datasets and keeps it in a temporary memory.

(Step S104) The similarity calculation unit 130 selects one variable from among those in the datasets under comparison.

(Step S105) The similarity calculation unit 130 generates a similarity matrix to represent similarity of variable values between the datasets under comparison. For example, the similarity calculation unit 130 generates intermediate datasets from each of the two datasets under comparison by using a transform matrix to convert variables other than the selected variable. One intermediate dataset has its quantity values corresponding to each specific variable value, while the other intermediate dataset has its own quality values corresponding to each specific variable value. The similarity calculation unit 130 then calculates similarity of those quantity values between the two intermediate datasets and compiles the resulting values into a similarity matrix, so that each component indicates the similarity between a pair of variable values.

(Step S106) Based on the above similarity matrix, the similarity calculation unit 130 generates new transform matrixes for the currently selected variable.

(Step S107) The similarity calculation unit 130 determines whether it has selected all variables. When all variables are done, the process advances to step S108. When any unselected variable is found, the process returns to step S104.

(Step S108) The similarity calculation unit 130 generates an intermediate dataset for each of the datasets under comparison by using transform matrixes newly generated for each variable.

(Step S109) The similarity calculation unit 130 calculates the similarity between the intermediate datasets generated above in step S108.

(Step S110) The similarity calculation unit 130 determines whether the process has reached its end condition. For example, an end condition is considered to be met when the similarity exhibits a convergence, or when the loop count of steps S104 to S110 has reached a predetermined maximum number. This similarity calculation process is terminated when such an end condition is met. Otherwise, the similarity calculation unit 130 causes the process to go back to step S104 while resetting the past selection of variables.

The above has described how the similarity between two datasets is calculated. Now, with reference to FIGS. 11 to 14, the description will present a more specific example of similarity calculation.

Figure 11:
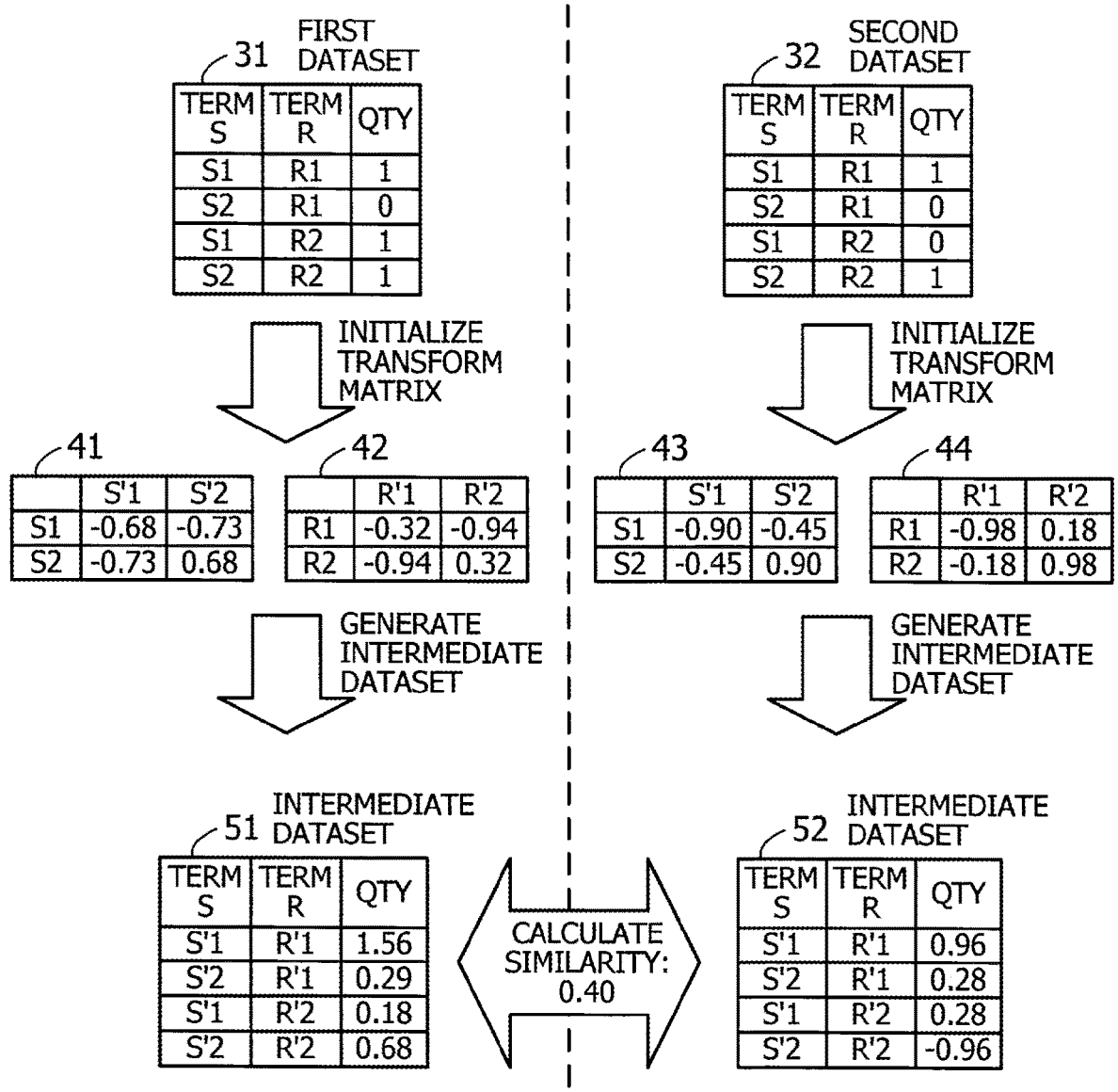
FIG. 11 illustrates an example of generating intermediate datasets using transform matrixes in initial state.

FIG. 11 illustrates an example of generating intermediate datasets using transform matrixes in initial state. This example is to make a comparison between a first dataset 31 and a second dataset 32. The illustrated process begins with initializing transform matrixes 41 and 42 respectively for Term S and Term R in the first dataset 31. The first dataset 31 is then transformed into an intermediate dataset 51 using the initial transform matrixes 41 and 42. Also initialized are transform matrixes 43 and 44 for Term S and Term R in the second dataset 32. The second dataset 32 is then transformed into an intermediate dataset 52 using the initial transform matrixes 43 and 44. The illustrated process calculates the similarity between two intermediate datasets 51 and 52 derived from the first and second datasets 31 and 32. At this initial stage of FIG. 11, the intermediate datasets 51 and 52 have a similarity value of 0.40.

Figure 12:
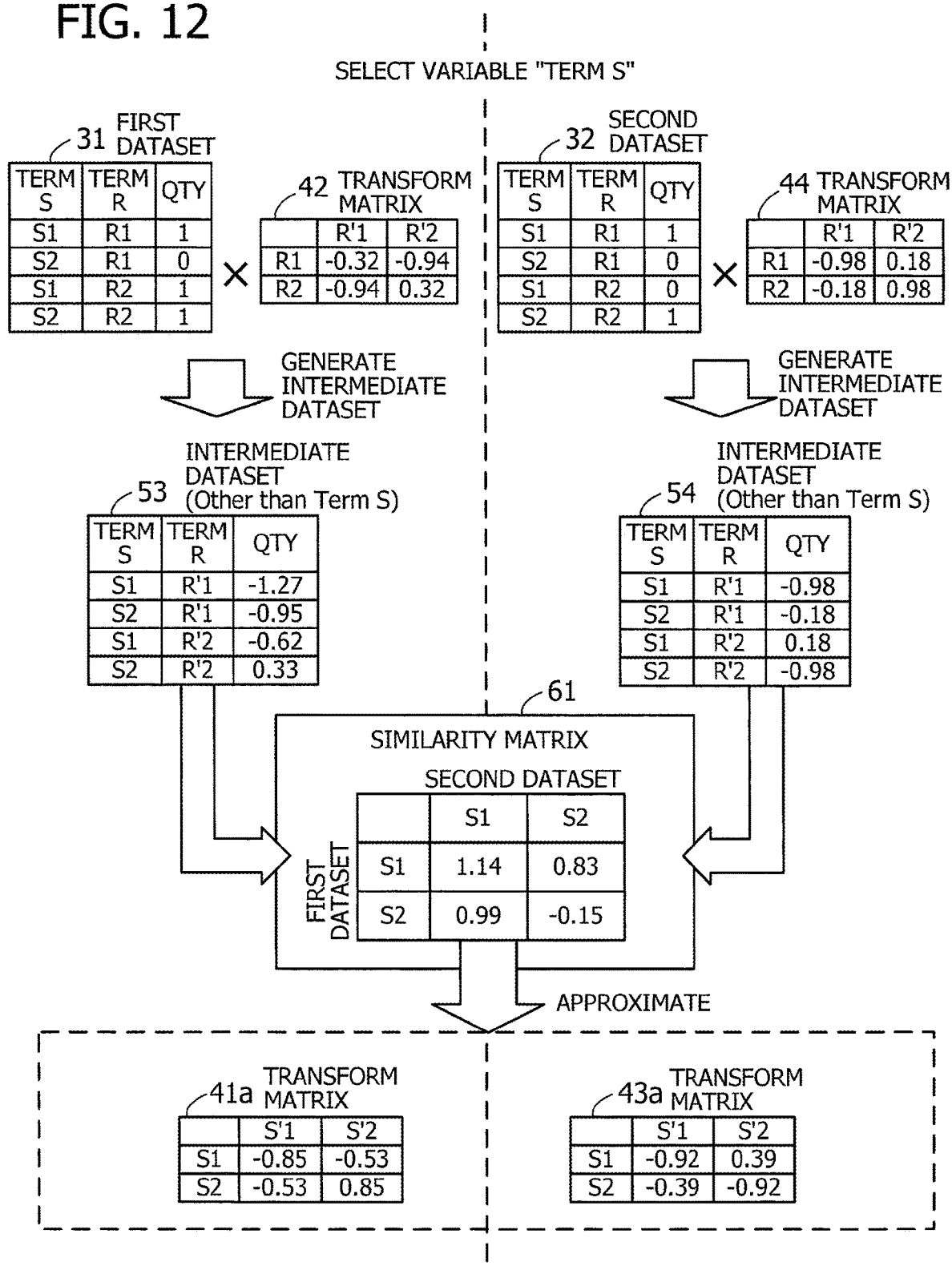
FIG. 12 illustrates an example of an update of transform matrixes for Term S.

Suppose now that variable "Term S" is selected. This selection causes an update of transform matrixes for Term S as follows. FIG. 12 illustrates an example of an update of transform matrixes for Term S. An intermediate dataset 53 is generated from the first dataset 31 by transforming variable values other than Term S using the transform matrix 42 for Term R. Likewise, an intermediate dataset 54 is generated from the second dataset 32 by transforming variable values other than Term S using the transform matrix 44 for Term R. A similarity matrix 61 is then generated from the two intermediate datasets 53 and 54 to indicate similarity between their respective variables. Two transform matrixes 41a and 43a are generated on the basis of this similarity matrix 61. Here the product of these transform matrixes 41a and 43a has a close resemblance to the similarity matrix 61.

Figure 13:
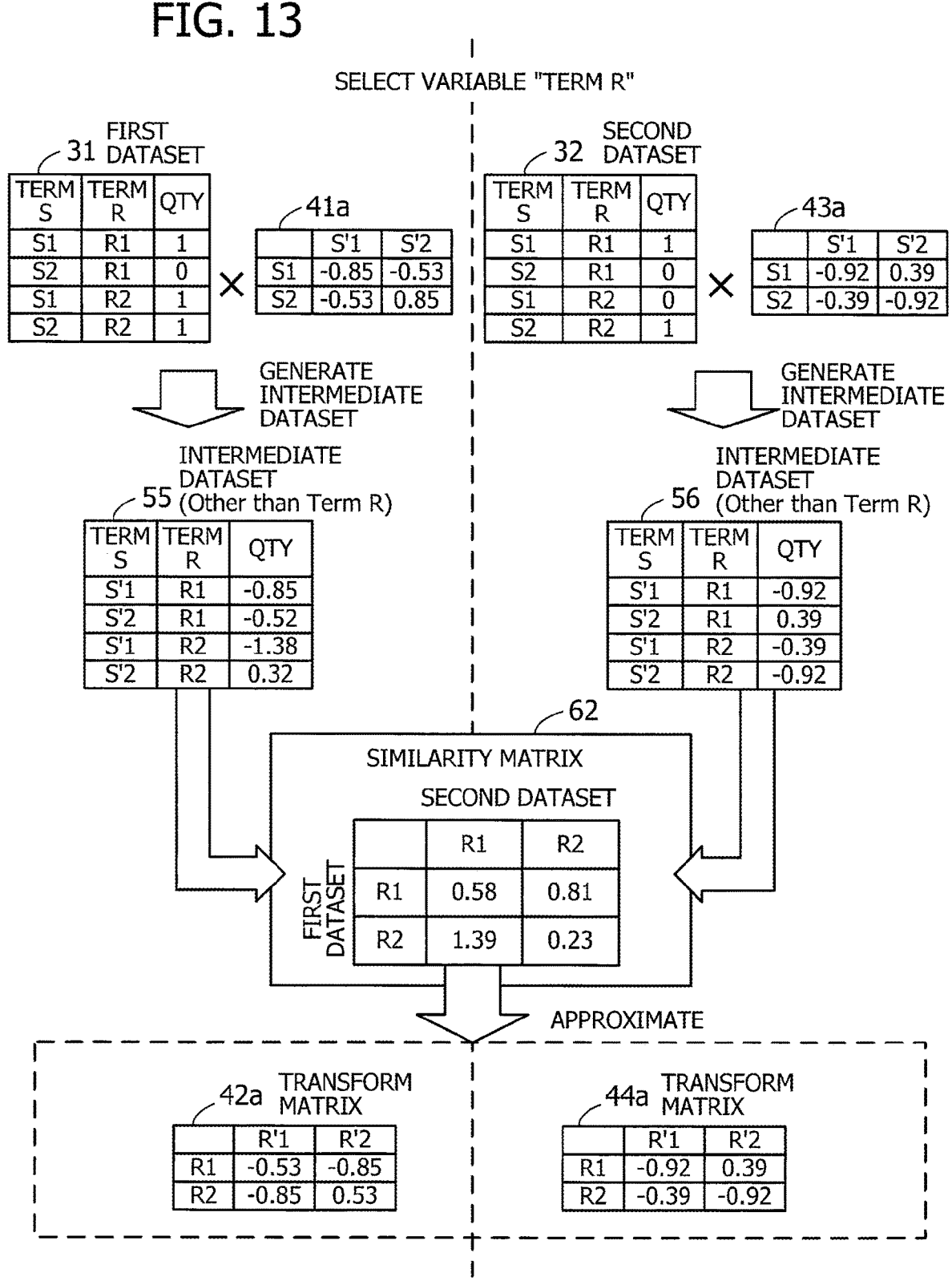
FIG. 13 illustrates an example of an update of transform matrixes for Term R.

Suppose next that variable "Term R" is selected. This selection causes an update to transform matrixes for Term R as follows. FIG. 13 illustrates an example of an update of transform matrixes for Term R. An intermediate dataset 55 is generated from the first dataset 31 by transforming variable values other than Term R using the transform matrix 41a for Term S. Likewise, an intermediate dataset 56 is generated from the second dataset 32 by transforming variable values other than Term R using the transform matrix 43a for Term S. A similarity matrix 62 is then generated from the two intermediate datasets 55 and 56 to indicate similarity between their respective variables. Two transform matrixes 42a and 44a are generated on the basis of this similarity matrix 62. Here the product of these transform matrixes 42a and 44a has a close resemblance to the similarity matrix 62.

Now that transform matrixes have been updated in both variables "Term S" and "Term R," new intermediate dataset are generated on the basis of the updated transform matrixes 41a, 42a, 43a, and 44a as follows.

Figure 14:
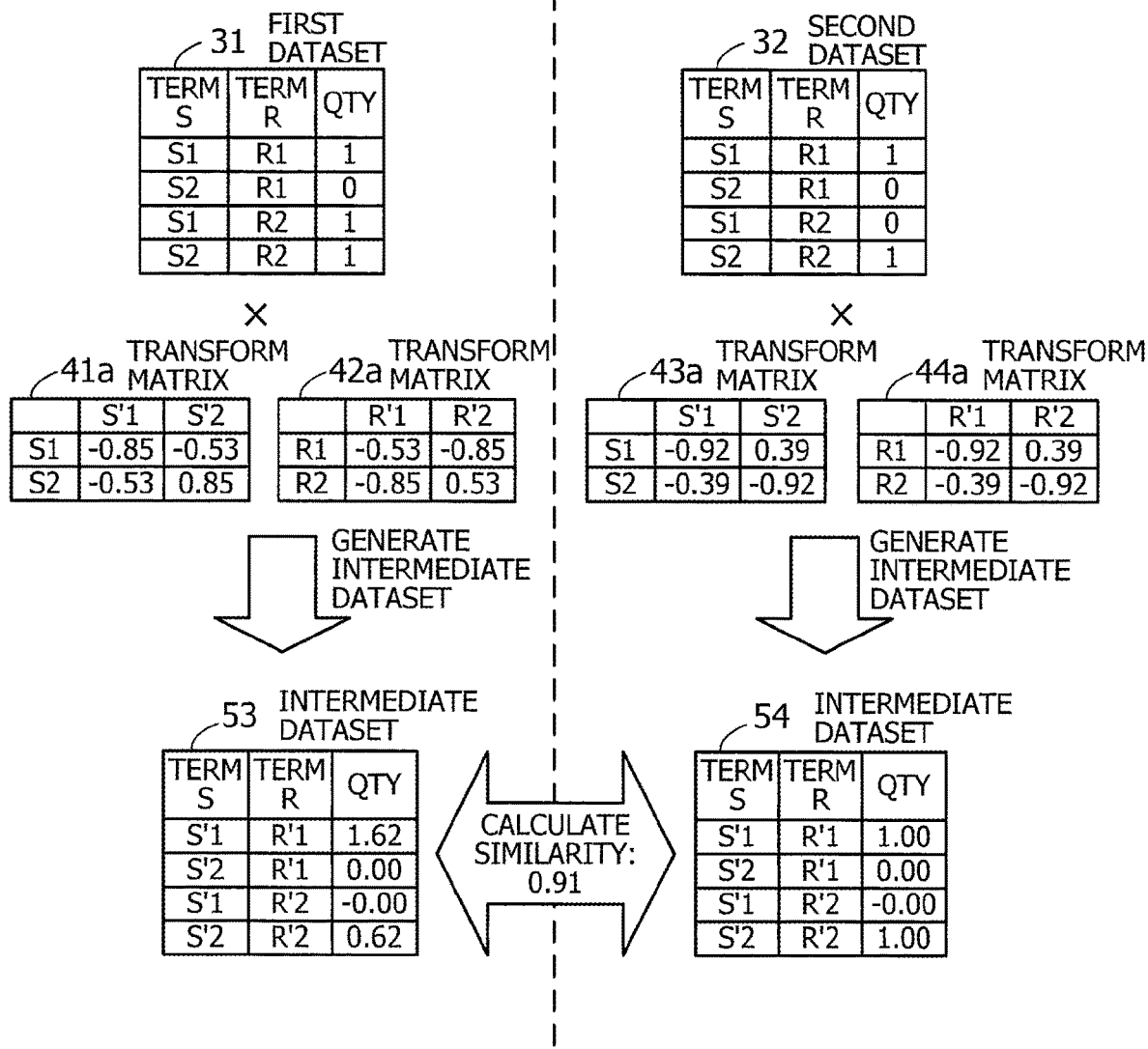
FIG. 14 illustrates an example of generating intermediate datasets using updated transform matrixes.

FIG. 14 illustrates an example of generating intermediate datasets using updated transform matrixes. For example, an intermediate dataset 53 is generated from the first dataset 31 using updated transform matrixes 41a and 42a. Likewise, an intermediate dataset 54 is generated from the second dataset 32 using updated transform matrixes 43a and 44a. The illustrated process of FIG. 14 then calculates the similarity between the two intermediate datasets 53 and 54. At this post-update stage of FIG. 14, the intermediate datasets 53 and 54 have a similarity value of 0.91.

With the use of updated transform matrixes 41a, 42a, 43a, and 44a, the current intermediate datasets 53 and 54 in FIG. 14 exhibit a closer similarity than the previous intermediate datasets 51 and 52 in FIG. 11. In other words, the similarity between intermediate datasets has increased as a result of the updates performed on the initial transform matrixes 41 to 44. More rounds of updates may be exerted on the current transform matrixes 41a, 42a, 43a, and 44a in expectation of a higher similarity of intermediate datasets. The improvement rate would, however, be reduced as the update processing is repeated, and the similarity value would thus converge into a certain level.

The similarity calculation unit 130 generates new intermediate datasets and calculates their similarity until it reaches the point at which the increase rate of similarity falls below a specified threshold. This point is interpreted as indicating the similarity between the first and second datasets 31 and 32 under comparison. The similarity calculation unit 130 then stores the similarity value in the similarity data storage unit 140.

As can be seen from the above description, the second embodiment is designed to determine the similarity between datasets by using transform matrixes to generate intermediate datasets and evaluating their similarity. These features of the second embodiment improve the accuracy of similarity determination.

Figure 16:
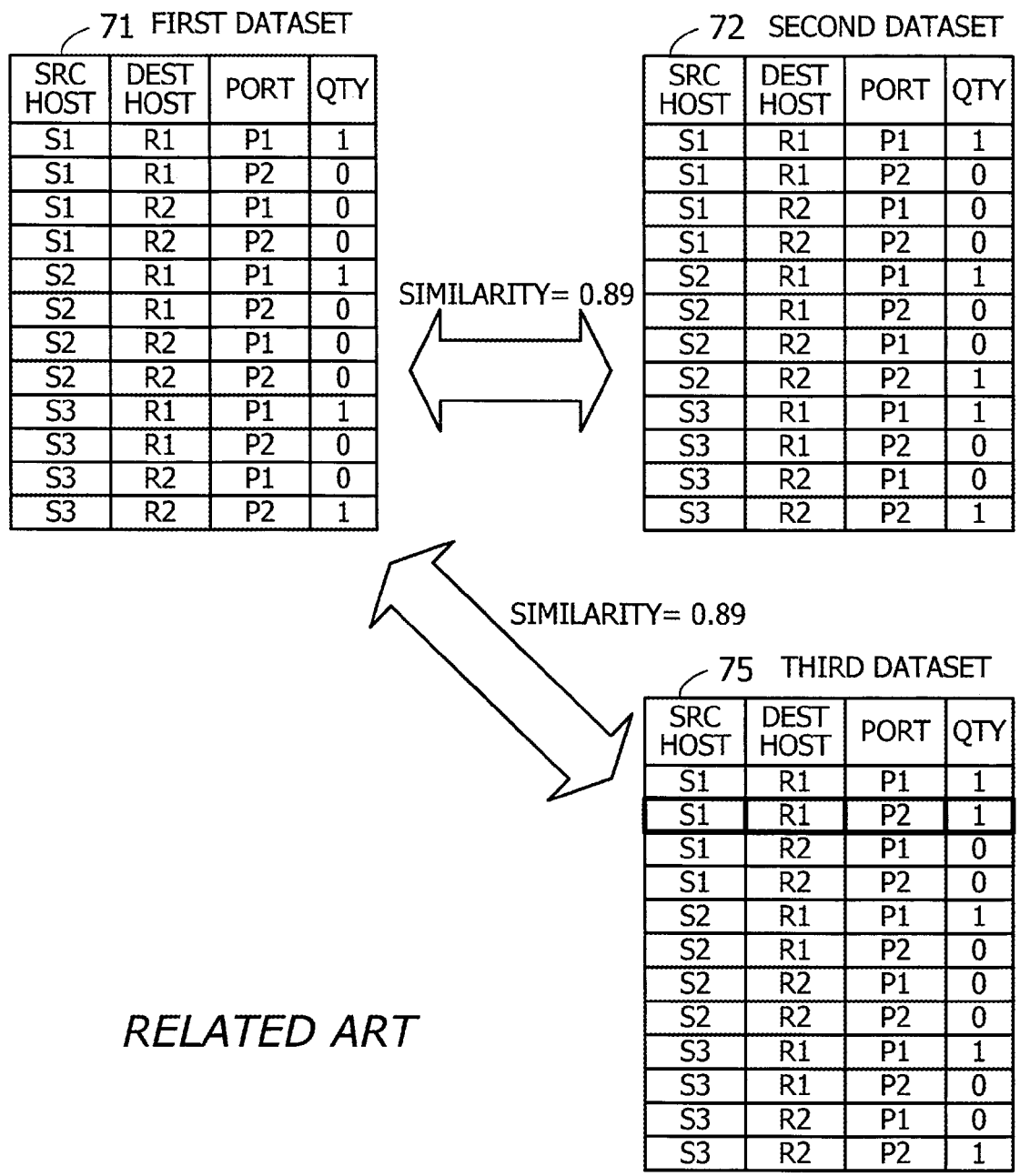

Referring now to FIGS. 15 and 16, the following section will present an example of another method of similarity calculation for the purpose of comparison with the second embodiment. Specifically, this example method relies only on re-association and re-arrangement of variable values in given datasets.

FIG. 15 is a first diagram illustrating an example of similarity calculation for comparison purposes. The illustrated example of FIG. 15 is to calculate the similarity between a first dataset 71 and a second dataset 72. It is noted that a device "S2" in the collection period of the second dataset 72 may have played the same role of a device "S1" in the collection period of the first dataset 71. This possibility has a significance when one classifies relationships between humans or objects. Referring to the example of FIG. 15, the records of each dataset are rearranged while associating source hosts, destination hosts, and ports with different variable values. The rearrangement of records brings about transformed datasets 73 and 74. These two transformed datasets 73 and 74 have a unified form in which the variable values representing source hosts, destination hosts, and ports are seen in various combinations, arranged in the same order. Referring to the example of FIG. 15, both transformed datasets 73 and 74 have a record of (S'1, R'1, P'1) at the topmost place, followed by a record of (S'1, R'1, P'2).

As described above, the transformed datasets 73 and 74 provide their respective series of records, each having a specific value in the quantity field. The similarity between the transformed datasets 73 and 74 is calculated by comparing each pair of quantity values in the corresponding records. For example, the similarity may be calculated as an inner product of two vectors constructed from quantity values. In this case, the resulting similarity may vary depending on how the variable values in the transformed datasets 73 and 74 are associated with those in the first and second datasets 71 and 72. To maximize the similarity, many transformed datasets 73 and 74 are generated and tried in various association patterns. When a certain pair of transformed datasets 73 and 74 exhibits the closest similarity, it is interpreted as indicating the similarity between the first dataset 71 and second dataset 72.

FIG. 16 is a second diagram illustrating an example of similarity calculation for comparison purposes. The topmost two tables seen in FIG. 16 are the first dataset 71 and second dataset 72 compared in FIG. 15. The foregoing method of FIG. 15 gives a similarity value of 0.89. The same method may be applied to another combination of datasets. FIG. 16 indicates that the combination of a first dataset 71 and a third dataset 75 also exhibits a similarity value of 0.89.

Let us now investigate the relationships between destination host and port in the first dataset 71 and second dataset 72. As seen in FIG. 16, every record having a quantity value of one contains a combination of {R1, P1} or {R2, P2}. In this connection, the third dataset 75 has a noticeable record including {R1, P2} together with a quantity value of one. This fact strongly suggests that the first dataset 71 and second dataset 72 are communication logs collected in similar situations, except that disconnection or merging of source hosts was encountered. The third dataset 75, on the other hand, is likely to be a communication log of other events.

FIG. 16 has demonstrated that the foregoing method of FIG. 15 gives the same similarity value to the third dataset 75 as in the case of the second dataset 72, both with respect to the first dataset 71. This means its inability to calculate correct similarity.

Figure 17:
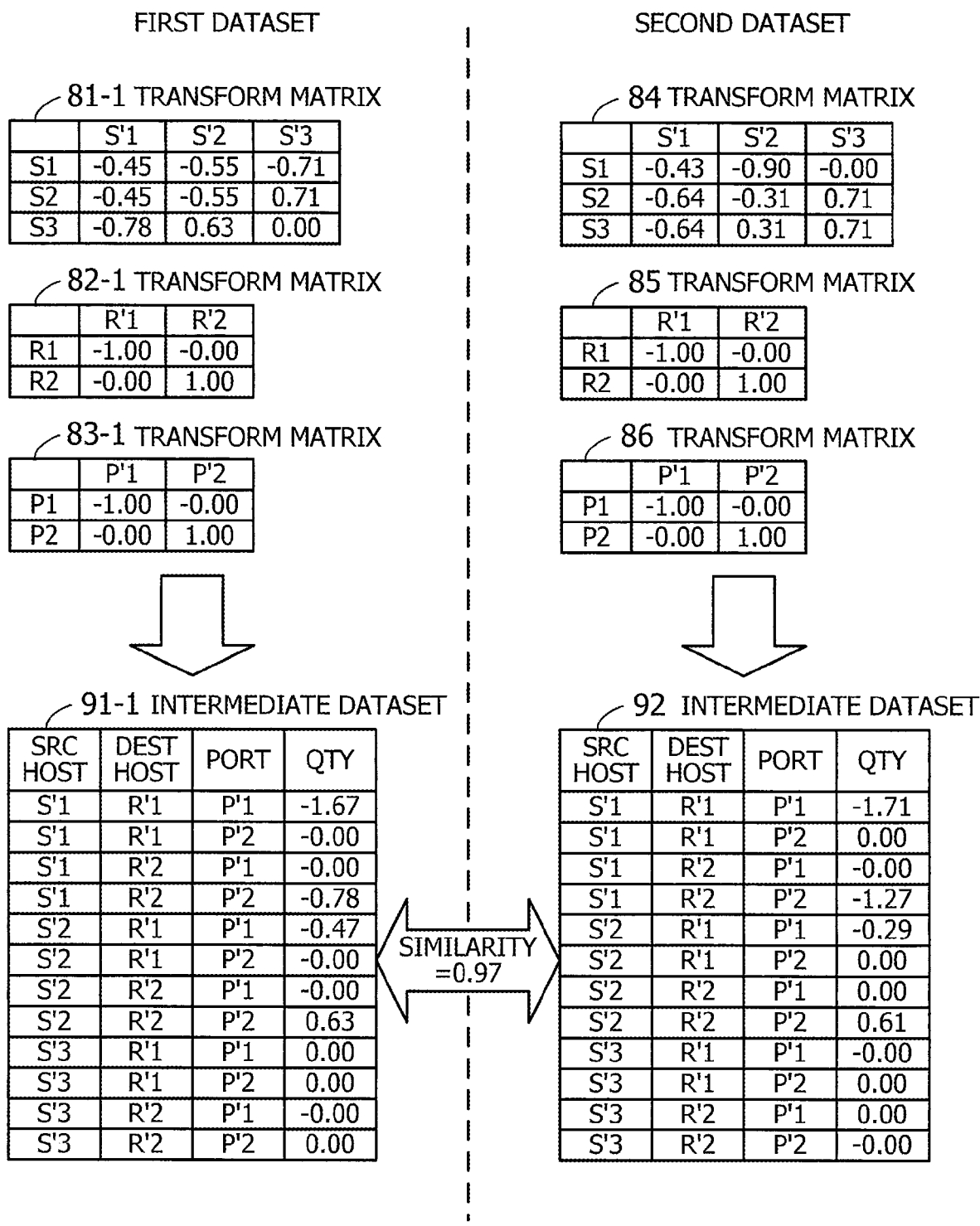
FIGS. 17 and 18 are first and second diagrams illustrating an example of similarity calculation according to the second embodiment.
Figure 18:
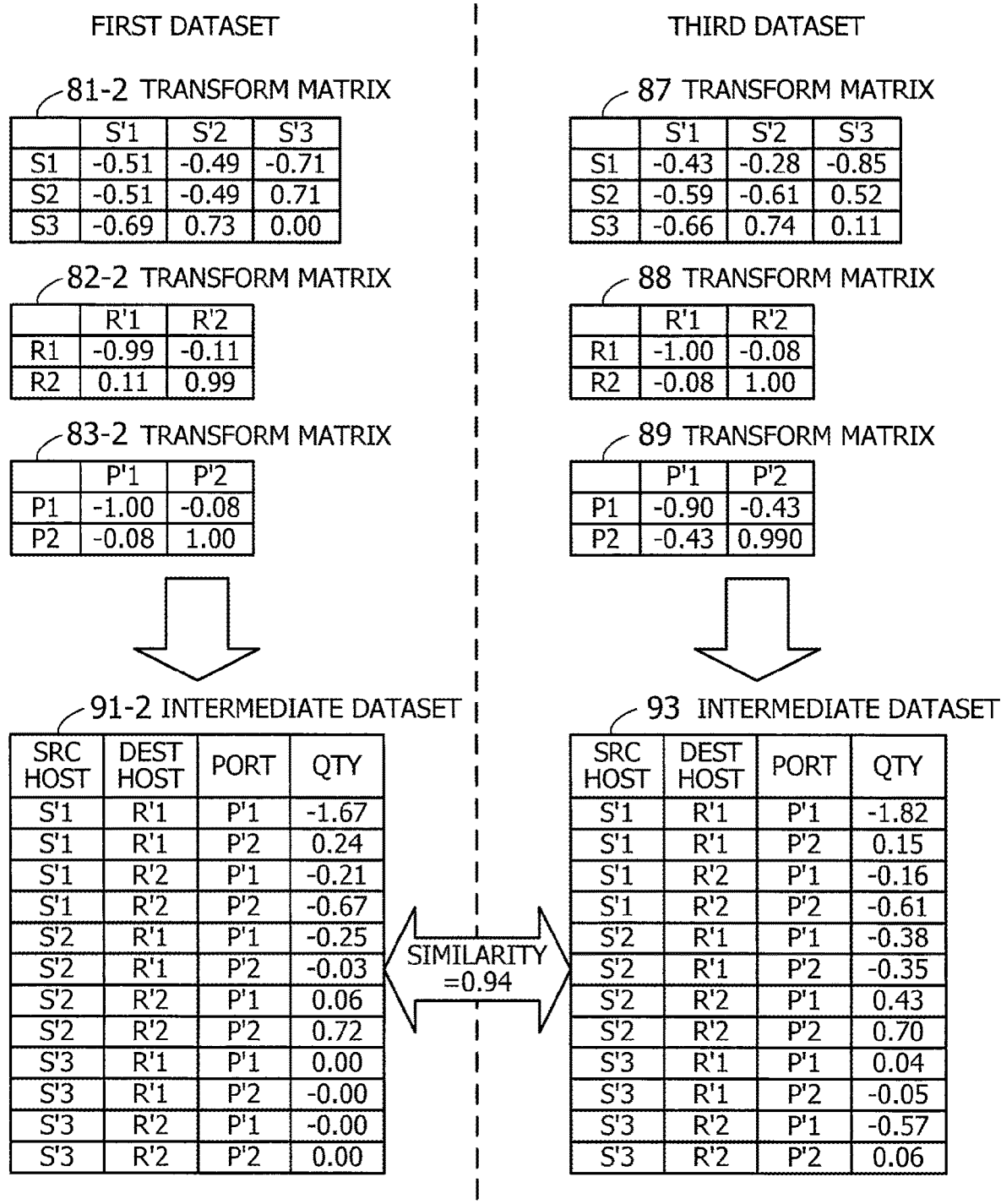

Referring next to FIGS. 17 and 18, the following section will describe how the second embodiment deals with the above case of first to third datasets 71, 72, and 73. FIG. 17 is a first diagram illustrating an example of similarity calculation according to the second embodiment. Specifically, FIG. 17 presents an example of similarity calculation with first and second datasets 71 and 72. Three transform matrixes 81-1, 82-1, and 83-1 have been generated respectively with source host, destination host, and port on the basis of the first dataset 71. These transform matrixes 81-1, 82-1, and 83-1 are used to transform the first dataset 71 into an intermediate dataset 91-1. Another three transform matrixes 84, 85, and 85 have also been generated respectively with source host, destination host, and port, but on the basis of the second dataset 72. These transform matrixes 84 to 85 are used to transform the second dataset 72 into an intermediate dataset 92. The two intermediate datasets 91-1 and 92 have a similarity value of 0.97.

FIG. 18 is a second diagram illustrating an example of similarity calculation according to the second embodiment. Specifically, FIG. 18 presents an example of similarity calculation with first and third datasets 71 and 75. Three transform matrixes 81-2, 82-2, and 83-2 have been generated respectively with source host, destination host, and port on the basis of the first dataset 71. These transform matrixes 81-2, 82-2, and 83-2 are used to transform the first dataset 71 into an intermediate dataset 91-2. Another three transform matrixes 87, 88, and 89 have been generated respectively with source host, destination host, and port on the basis of the third dataset 75. These transform matrixes 87 to 89 are used to transform the third dataset 75 into an intermediate dataset 93. The two intermediate datasets 91-2 and 93 have a similarity value of 0.94.

As seen from the calculation results of FIGS. 17 and 18, the first dataset 71 is more similar to the second embodiment than to the third dataset 75. That is, the second embodiment offers an improved accuracy of similarity calculation because it correctly reflects the relationships between variable values.

The method discussed in FIGS. 15 and 16 consumes a large amount of computing resources for the purpose of improved accuracy, because all possible rearrangement patterns have to be examined. Suppose, for example, that the problem has three items (e.g., humans or objects) and they have A, B, and C variations, respectively. A, B, and C are integers greater than zero. The method discussed in FIGS. 15 and 16 solves this problem by exhaustively calculating similarity in as many as A!B!C! combinatorial patterns. In contrast, the second embodiment solves the same problem with computation that is proportional to $(A^2+B^2+C^2)ABC$. In the case of A=10, B=10, and C=10, the second embodiment is about 160 trillion times faster than the method discussed in FIGS. 15 and 16.

As described above, the second embodiment has introduced transformation of input datasets on the basis of weighting of variable values. The proposed techniques thus enable efficient execution of a high-accuracy similarity determination process for communication logs even if they record similar events that the hosts encountered in different conditions.

(c) Other Embodiments

The above-described second embodiment calculates the similarity between communication logs collected in different unit periods. It is, however, not intended to limit the embodiments by that specific application. The same techniques may also be applied to similarity evaluation in other kinds of datasets. The result of similarity calculation may be used in various technical fields, including data classification, data mining, and machine learning.

The above description has exemplified several embodiments and their variations. The described components may be replaced with other components having equivalent functions or may include some additional components or processing operations. Where appropriate, two or more components and features of the above-described embodiments may be combined in different ways.

Several embodiments and their variations have been discussed above. In one aspect, the proposed techniques make it possible to improve the accuracy of similarity calculation performed on datasets.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a data transformation program that causes a computer to perform a procedure comprising:
 obtaining a first dataset having three or more items and a second dataset having the three or more items in a memory, the first dataset being a collection of first records each including a numerical value that indicates a relationship among three or more first item values belonging to the three or more items, respectively, the second dataset being a collection of second records each including a numerical value that indicates a relationship among three or more second item values belonging to the three or more items, respectively;

selecting one of the three or more items so as to divide the first item values into selected first item values belonging to a selected item which is selected and non-selected first item values belonging to two or more non-selected items which are not selected, as well as the second item values into selected second item values belonging to the selected item and non-selected second item values belonging to the two or more non-selected items;

calculating similarity between relationships of the selected first item values with the non-selected first item values in the first dataset and relationships of the selected second item values with the non-selected second item values in the second dataset;

generating, based on the calculated similarity, a first weight dataset that includes first weight values to be multiplied by the selected first item values to calculate a subset of transformed item values that belongs to the selected item, as well as a second weight dataset that includes second weight values to be multiplied by the selected second item values to calculate the subset of transformed item values that belongs to the selected item, the first weight dataset being a first matrix that satisfies orthonormality conditions, the first matrix being formed from the first weight values, the second weight dataset being a second matrix that satisfies orthonormality conditions, the second matrix being formed from the second weight values;

repeating the calculating of similarity and the generating of the first weight dataset and the second weight dataset, while changing the selected item;

transforming the first dataset having the three or more items into a first similarity-determining dataset having the three or more items, based on the first weight datasets generated for the three or more items as a result of the repeating, the first similarity-determining dataset being a collection of third records each including a numerical value that indicates a relationship among three or more of the transformed item values belonging to the three or more items, respectively;

transforming the second dataset having the three or more items into a second similarity-determining dataset having the three or more items, based on the second weight datasets generated for the three or more items as a result of the repeating, the second similarity-determining dataset being a collection of fourth records each including a numerical value that indicates a relationship among three or more of the transformed item values belonging to the three or more items, respectively; and storing the first similarity-determining dataset and the second similarity-determining dataset in the memory.

2. The non-transitory computer-readable storage medium according to claim 1, wherein the generating of a first weight dataset and a second weight dataset includes:

generating, with respect to each of the three or more items, initial first and second weight datasets formed from initial weight values, the initial first weight datasets including non-selected initial first weight datasets generated with respect to the two or more non-selected item, the initial second weight datasets including non-selected initial second weight datasets generated with respect to the two or more non-selected; and calculating, based on the non-selected initial first weight datasets and non-selected initial second weight datasets, similarity between relationships of the selected first item values with the non-selected first item values in the first dataset and relationships of the selected second item values with the non-selected second item values in the second dataset.

3. The non-transitory computer-readable storage medium according to claim 1, wherein the generating of a first weight dataset and a second weight dataset includes:

repeating a process of selecting the three or more items individually and generating new first and second weight datasets for the selected items until a specific end condition is met.

4. The non-transitory computer-readable storage medium according to claim 1, wherein the procedure further includes:

calculating similarity between numerical values included in the third records of the first similarity-determining dataset and numerical values included in the fourth records of the second similarity-determining dataset.

5. A data transformation method comprising:

obtaining a first dataset having three or more items and a second dataset having the three or more items in a memory, the first dataset being a collection of first records each including a numerical value that indicates a relationship among three or more first item values belonging to the three or more items, respectively, the second dataset being a collection of second records each including a numerical value that indicates a relationship among three or more second item values belonging to the three or more items, respectively;

selecting, by a processor, one of the three or more items so as to divide the first item values into selected first item values belonging to a selected item which is selected and non-selected first item values belonging to two or more non-selected items which are not selected, as well as the second item values into selected second item values belonging to the selected item and non-selected second item values belonging to the two or more non-selected items;

calculating, by the processor, similarity between relationships of the selected first item values with the non-selected first item values in the first dataset and relationships of the selected second item values with the non-selected second item values in the second dataset;

generating, by the processor, based on the calculated similarity, a first weight dataset that includes first weight values to be multiplied by the selected first item values to calculate a subset of transformed item values that belongs to the selected item, as well as a second weight dataset that includes second weight values to be multiplied by the selected second item values to calculate the subset of transformed item values that belongs to the selected item, the first weight dataset being a first matrix that satisfies orthonormality conditions, the first matrix being formed from the first weight values, the second weight dataset being a second matrix that satisfies orthonormality conditions, the second matrix being formed from the second weight values;

repeating, by the processor, the calculating of similarity and the generating of the first weight dataset and the second weight dataset, while changing the selected item;

transforming, by the processor, the first dataset having the three or more items into a first similarity-determining dataset having the three or more items, based on the first weight datasets generated for the three or more items as a result of the repeating, the first similarity-determining dataset being a collection of third records each including a numerical value that indicates a relationship among three or more of the transformed item values belonging to the three or more items, respectively;

transforming, by the processor, the second dataset having the three or more items into a second similarity-determining dataset having the three or more items, based on the second weight datasets generated for the three or more items as a result of the repeating, the second similarity-determining dataset being a collection of fourth records each including a numerical value that indicates a relationship among three or more of the transformed item values belonging to the three or more items, respectively; and storing the first similarity-determining dataset and the second similarity-determining dataset in the memory.

6. A data transformation apparatus comprising:

a memory configured to store therein a first dataset having three or more items and a second dataset having the three or more items, the first dataset being a collection of first records each including a numerical value that indicates a relationship among three or more first item values belonging to the three or more items, respectively, the second dataset being a collection of second records each including a numerical value that indicates a relationship among three or more second item values belonging to the three or more items, respectively; and a processor configured to perform a procedure including:

selecting one of the three or more items so as to divide the first item values into selected first item values belonging to a selected item which is selected and non-selected first item values belonging to two or more non-selected items which are not selected, as well as the second item values into selected second item values belonging to the selected item and non-selected second item values belonging to the two or more non-selected items, calculating similarity between relationships of the selected first item values with the non-selected first item values in the first dataset and relationships of the selected second item values with the non-selected second item values in the second dataset, generating, based on the calculated similarity, a first weight dataset that includes first weight values to be multiplied by the selected first item values to calculate a subset of transformed item values that belongs to the selected item, as well as a second weight dataset that includes second weight values to be multiplied by the selected second item values to calculate the subset of transformed item values that belongs to the selected item, the first weight dataset being a first matrix that satisfies orthonormality conditions, the first matrix being formed from the first weight values, the second weight dataset being a second matrix that satisfies orthonormality conditions, the second matrix being formed from the second weight values, repeating the calculating of similarity and the generating of the first weight dataset and the second weight dataset, while changing the selected item, transforming the first dataset having the three or more items into a first similarity-determining dataset having the three or more items, based on the first weight datasets generated for the three or more items as a result of the repeating, the first similarity-determining dataset being a collection of third records each including a numerical value that indicates a relationship among three or more of the transformed item values belonging to the three or more items, respectively, transforming the second dataset having the three or more items into a second similarity-determining dataset having the three or more items, based on the second weight datasets generated for the three or more items as a result of the repeating, the second similarity-determining dataset being a collection of fourth records each including a numerical value that indicates a relationship among three or more of the transformed item values belonging to the three or more items, respectively, and storing the first similarity-determining dataset and the second similarity-determining dataset in the memory.

* * * * *